(12) United States Patent
Sasaki et al.

(10) Patent No.: US 11,431,569 B2
(45) Date of Patent: Aug. 30, 2022

(54) COMMUNICATION APPARATUS, SYSTEM, ROLLBACK METHOD, AND NON-TRANSITORY MEDIUM

(71) Applicant: NEC Corporation, Tokyo (JP)

(72) Inventors: Takayuki Sasaki, Tokyo (JP); Daniele Enrico Asoni, Zurich (CH); Adrian Perrig, Zurich (CH)

(73) Assignee: NEC CORPORATION, Tokyo (JP)

( * ) Notice: Subject to any disclaimer, the term of this patent is extended or adjusted under 35 U.S.C. 154(b) by 758 days.

(21) Appl. No.: 16/316,074

(22) PCT Filed: Jul. 21, 2016

(86) PCT No.: PCT/JP2016/003416
§ 371 (c)(1),
(2) Date: Jan. 8, 2019

(87) PCT Pub. No.: WO2018/015983
PCT Pub. Date: Jan. 25, 2018

(65) Prior Publication Data
US 2021/0281482 A1 Sep. 9, 2021

(51) Int. Cl.
*H04L 41/085* (2022.01)
*H04L 41/0816* (2022.01)
(Continued)

(52) U.S. Cl.
CPC ...... *H04L 41/0863* (2013.01); *H04L 41/0816* (2013.01); *H04L 45/38* (2013.01); *H04L 49/9047* (2013.01)

(58) Field of Classification Search
CPC ... H04L 41/0863; G06F 11/1402; G06F 9/461
See application file for complete search history.

(56) References Cited

U.S. PATENT DOCUMENTS 9,197,494 B2   11/2015   Yamato et al.
9,577,920 B2   2/2017    Yamato et al.
(Continued)

FOREIGN PATENT DOCUMENTS

EP    2916487 A1      9/2015
JP    2003-234757 A   8/2003
(Continued)

OTHER PUBLICATIONS

Japanese Office Action for JP Application No. 2019-502814 dated Mar. 3, 2020 with English Translation.
(Continued)

*Primary Examiner* — William G Trost, IV
*Assistant Examiner* — Christopher P Cadorna

(57) ABSTRACT

A communication apparatus comprises a rollback control unit to create a second process to roll back a currently working first process thereto; a storage to store states shared by the first and the second processes, the second process taking over a state(s) stored in the storage unit; a buffer; and a timing control unit that controls of timing of rollback. The rollback control unit starts event buffering to store in the buffer all of an event(s) received during when the first process is processing and destined to the first process, and upon completion of the processing of the event by the first process, the rollback control unit performs switching of a working process from the first process to the second process, sends the event(s) stored therein from start of the event buffering to the second process and stop event buffering.

20 Claims, 18 Drawing Sheets

(51) Int. Cl.
　　*H04L 45/00* (2022.01)
　　*H04L 49/9047* (2022.01)
　　*H04L 41/0859* (2022.01)

(56) References Cited

U.S. PATENT DOCUMENTS

| | | |
|---|---|---|
| 2003/0117949 A1 | 6/2003 | Moller et al. |
| 2013/0201821 A1* | 8/2013 | Yamato ............... H04L 41/0893 370/225 |
| 2014/0195485 A1* | 7/2014 | Dorman ................ G06F 16/178 707/624 |
| 2015/0156113 A1 | 6/2015 | Chiba et al. |
| 2015/0293759 A1 | 10/2015 | Zhao |
| 2016/0050654 A1 | 2/2016 | Kanaumi |
| 2016/0057052 A1* | 2/2016 | Zhang .................... H04L 47/33 709/239 |
| 2016/0072700 A1 | 3/2016 | Yamato et al. |
| 2016/0364226 A1 | 12/2016 | Takano et al. |
| 2018/0165156 A1* | 6/2018 | Sasaki .................... G06F 21/44 |

FOREIGN PATENT DOCUMENTS

| | | |
|---|---|---|
| JP | 2013-545321 A | 12/2013 |
| JP | 2015-519765 A | 7/2015 |
| JP | 2016-048833 A | 4/2016 |
| WO | 2014/157241 A1 | 10/2014 |
| WO | 2015/037116 A1 | 3/2015 |
| WO | 2015/146355 A1 | 10/2015 |

OTHER PUBLICATIONS

"OpenFlow Switch Specification Version 1.5.0 (Protocal version 0x06)", Open Networking Foundation, Dec. 19, 2014 (p. 1-277).
Katta, et al., "Ravana: Controller Fault-Tolerance in Software-Defined Networking", Jun. 17-18, 2015 (pp. 1-12).
"Software-Defined Networking:The New Norm for Networks", ONF White Paper, Apr. 13, 2012, Open Networking Foundation (pp. 1-12).
International Search Report of PCT/JP2016/003416 dated Feb. 15, 2017.
Written Opinion of PCT/JP2016/003416 dated Feb. 15, 2017.

* cited by examiner

COMMUNICATION APPARATUS, SYSTEM, ROLLBACK METHOD, AND NON-TRANSITORY MEDIUM

This application is a National Stage Entry of PCT/JP2016/003416 filed on Jul. 21, 2016, the contents of all of which are incorporated herein by reference, in their entirety.

FIELD

The present invention relates to a communication apparatus, system, rollback method and non-transitory medium.

BACKGROUND

In an SDN (Software Defined Network) architecture, control and data planes are decoupled, network intelligence and state are logically centralized, and the underlying network infrastructure is abstracted from the applications, as a result of which unprecedented programmability, automation, and network control are provided to enable a carrier, for example, to build highly scalable, flexible networks that readily adapt to changing environments or needs (NPL (Non Patent Literature) 1). As illustrated in FIG. 16, the SDN architecture typically includes an SDN controller 1, SDN applications 2 connected to the SDN controller 1 via an SDN Northbound interface 4 and network elements 3 connected to the SDN controller 1 via an SDN control data plane interface (SDN Southbound interface 5). The SDN controller 1 receives instructions or requirements from the SDN applications 2 (Northbound applications) and relays the received instructions or requirements via the SDN Southbound interface 5 to the network elements 3. The SDN controller 1 also extracts and manages states information about the network from the network elements 3. Network elements 3 may include switches that perform functions of forwarding and processing of packet data. The following outlines OpenFlow, as an example of SDN. It is noted that OpenFlow is not the only protocol available in SDN.

A switch (also referred to as OpenFlow Switch: OFS) (corresponding to the network element 3 in FIG. 16, includes a flow table including one or more flow entries. Each flow entry includes a match field to be matched with header field information of a received packet, a counter field including statistics information such as the number of received packets and the number of received bytes, and an action field with zero or more actions that dictate how the switch handles a received packet whose header field information matches the match field. Upon reception of a packet, the switch retrieves the flow table thereof using header field information of the received packet. In the case of miss-hit (non-match), the switch sends the received packet (first packet) using a Packet-In message to a controller (SDN controller) over a secure channel.

On reception of the Packet-In message, based upon information on a source and a destination of the first packet, the controller (corresponding to the SDN controller in FIG. 16) computes a path for the packet by referring network topology information. Based upon the path, the controller generates a flow entry for each of switches disposed on the path and sets the generated flow entry for each switch on the path by sending a Flow-Modify (Flow-Mod) message thereto. Each of the switches on the path, on reception of one or more packets that follow the first packet and each have a header matching a match field of the flow entry set by the controller, forwards the one or more packets to a next node, for example, as prescribed in the action field of the flow entry. Regarding details of OpenFlow, reference may be made to NPL 2 listed in the below.

In PTL (Patent Literature) 1, there is disclosed an arrangement in which a first controller selects control information based on a transmission policy to send the control information to a second controller at a transmission timing of the control information and the second controller selects based on a reception policy control information from received control information to store selected control information in a storage.

In PTL 2, there is disclosed an arrangement in which, when a contamination in a flow entry of a switch is found, a controller controls to roll back a relevant flow table (flow entry) of another switch.

In PTL 3, though not related to the SDN architecture, but to a redundant system, there is disclosed an arrangement in which a working program can be switched to an alternative program at a timing so as not to hinder monitoring and control of a field device executed by the working program. When the working program is executing a high precision real time processing, timing of switching to the alternative program is postponed until completion of the real time processing.

[PTL 1] WO2014/157241 A1
[PTL 2] Japanese Translation of PCT International Application Publication No. JP-T2013-545321
[PTL 3] WO2015/037116 A1
[NPL 1] Software-Defined Networking: The New Norm for Networks, ONF White Paper Apr. 13, 2012 Internet URL: https://www.opennetworking.org/images/stories/downloads/sdn-reso urces/white-papers/wp-sdn-newnorm.pdf
[NPL 2] OpenFlow Switch Specification Version 1.5.0 (Protocol version 0x06) Dec. 19, 2014, Internet URL:https://www.opennetworking.org/images/stories/downloads/sdn-reso urces/onf-specifications/openflow/openflow-switch-v1.5.0.noipr.pdf
[NPL 3] Naga Katta, Haoyu Zhang, Michael Freedman, and Jennifer Rexford, "Ravana: controller fault-tolerance in software-defined networking", Proceedings of the 1st ACM SIGCOMM Symposium on Software Defined Networking Research (SOSR '15), Jun. 17-18, 2015

SUMMARY OF INVENTION

The disclosures of PTLs 1-3 and NPLs 1 to 3 given above are hereby incorporated in their entirety by reference into this specification.

The following analysis is made by the inventors of the present invention.

In SDN, a process such as a switch process or a controller process runs persistently.

Once the process is compromised by a malware or the like, a damage remains over time. In the related arts such as NPLs 1 and 2, there is not provided any mechanism that enables to recover a contaminated component or process. Thus, once a component or a network node such as a switch or controller is compromised, contamination may further spread over to an entirety of networks.

Such a rollback that rolls back a switch process or a controller process to a previously saved version may be used to revert the process to a pristine state. However, there may occur some inconsistencies, such as event loss, and/or reversal of event order in the rollback of a process, as later described in the embodiments.

NPL 3 discloses a fault-tolerant SDN controller platform termed Ravana that offers the abstraction of a fault-free centralized controller to control applications. Ravana that assumes a failover between physically separated controllers, deploys the following mechanisms in order to prevent the inconsistencies:

Buffering and retransmission of switch events (switch events are not lost),

Event IDs and filtering in the log (No event is processed more than once),

Master serializes events to a shared log (Replicas process events in the same order), Two-stage replication and deterministic replay of event log(Replicas build same internal state), RPC (Remote Procedure Call) acknowledgements from switches (Controller commands are not lost), Command IDs and filtering at switches (commands are not executed repeatedly).

Ravana ensures that transactions are totally ordered across replicas and executed exactly once across the entire system. Ravana is enabled to correctly handle switch state, without resorting to rollbacks or repeated execution of commands.

However, mechanisms of Ravana, as listed above, are too complex.

The present inventors have devised a solution to the issues in a rollback for reverting a process to a pristine state.

Accordingly, it is an object of the invention to provide a system, apparatus, method and non-transitory medium, each enabling to prevent an occurrence of inconsistency in a rollback of a process to ensure secure networking.

According to a first aspect of the disclosure, there is provided a communication apparatus, comprising: a rollback control unit that creates a second process to roll back a currently working first process to the second process;

a storage unit that stores one or more states shared by the first process and the second process, the storage unit enabling the second process to take over the one or more states stored therein;

a buffer; and a timing control unit configured to control timing of rollback, wherein the rollback control unit controls to start event buffering such that the buffer is set to store all of one or more events received and destined to the first process, when the first process is processing an event during the rollback, wherein, under a control of the timing control unit, upon completion of the processing of the event by the first process, the rollback control unit performs switching of a working process from the first process to the second process, and the rollback control unit controls to send the all of one or more events stored from start of the event buffering in the buffer to the second process switched from the first process and to stop the event buffering.

According to a second aspect of the disclosure, there is provided a switch apparatus adapted for flow-based packet forwarding, comprising:

a rollback control unit that creates a second process to roll back a currently working first switch process to the second switch process;

a storage unit that stores states shared by the first switch process and the second switch process, the storage unit enabling the second switch process to take over the one or more states stored therein;

a buffer;

a timing control unit that controls of timing of rollback;

a network interface adapted to be connected to a network; and a dispatcher that dispatches a packet or a message to an associated switch process, based on a dispatch rule that defines association between a matching condition and a switch process to which a received packet corresponding to the matching condition is to be dispatched, wherein, after creating the second switch process, the rollback control unit, upon finding that the first switch process is in process of handling an event related with a packet received, controls to start buffering such that the buffer is set to store all of one or more packets that are received during when the first switch process is processing the event and are to be dispatched by the dispatcher to the first switch process, and wherein under a control of the timing control unit, upon completion of the processing of the event by the first switch process, the rollback control unit performs switching of a working process from the first switch process to the second switch process, and the rollback control unit controls to send all of the one or more packets stored from start of the buffering in the buffer to the second switch process switched from the first switch process and stop the buffering.

According to a third aspect of the disclosure, there is provided a controller apparatus controlling one or more switches, the controller comprising: a rollback control unit that creates a second controller process to roll back a currently working first controller process to the second controller process;

a storage unit that stores states shared by the first controller process and the second controller process, the storage unit enabling the second controller process to take over the one or more states stored therein;

a buffer;

a timing control unit that controls of timing of rollback;

a network interface adapted to be connected to the switch; and a dispatcher that dispatches a packet or a message received to an associated controller process, based on a dispatch rule that defines association between a matching condition and a controller process to which a received packet corresponding to the matching condition is to be dispatched, wherein, after creating the second controller process, the rollback control unit, upon finding that the first controller process is in process of handling an event related with a packet received, controls to start buffering such that the buffer is set to store all of one or more packets that are received during when the first controller process is processing the event and are to be dispatched by the dispatcher to the first controller process, and wherein under a control of the timing control unit, upon completion of the processing of the event by the first controller process, the rollback control unit performs switching of a working process from the first controller process to the second controller process, and the rollback control unit controls to send all of the one or more packets stored from start of the buffering in the buffer to the second controller process switched from the first controller process and to stop the buffering.

According to a fourth aspect of the disclosure, there is provided a communication system, comprising:

one or more switches, each adapted for a flow-based packet forwarding;

a controller to control the one or more switches, wherein the switch comprises:

a rollback control unit that creates a second process to roll back a currently working first switch process to the second switch process;

a storage unit that stores states shared by the first switch process and the second switch process, the storage unit enabling the second switch process to take over the one or more states stored therein;

a buffer;

a timing control unit that controls of timing of rollback, a network interface adapted to be connected to a network; and a dispatcher that dispatches a packet or a message received to an associated switch process, based on a dispatch rule that defines association between a matching condition and a switch process to which a received packet corresponding to the matching condition is to be dispatched, wherein, after creating the second switch process, the rollback control unit, upon finding that the first switch process is in process of handling an event related with a packet received, controls to start buffering such that the buffer is set to store all of one or more packets that are received during when the first switch process is processing the event and are to be dispatched by the dispatcher to the first switch process, and wherein under a control of the timing control unit, upon completion of the processing of the event by the first switch process, the rollback control unit performs switching of a working process from the first switch process to the second switch process, and the rollback control unit controls to send all of the one or more packets stored from start of the buffering in the buffer to the second switch process switched from the first switch process and stop the buffering.

According to a fifth aspect of the disclosure, there is provided a computer-implemented rollback method, comprising:

creating a second process to roll back a currently working first process to the second process, the first process and the second process sharing states stored in a storage unit, the second process being enable to take over the one or more states stored in the storage unit;

starting, after the second process is created, event buffering to store in a buffer all of one or more events received and destined to the first process during the rollback, when the first process is processing an event; and upon completion of the processing of the event by the first process, performing switching of a working process from the first process to the second process; and sending all of the one or more events stored from start of the event buffering in the buffer to the second process switched from the first process and stopping the event buffering.

According to a sixth aspect of the disclosure, there is provided a program causing a computer to execute the processing comprising:

creating a second process to roll back a currently working first process to the second process;

the first process and the second process sharing states stored in a storage, the second process being enable to take over the one or more states stored in the storage unit;

dispatching a packet received to an associated process, based on a dispatch rule that defines association between a matching condition and a target process to which a received packet corresponding to the matching condition is to be dispatched;

after creating the second process, upon finding that the first process is in process of handling an event related with a packet received, starting buffering to store in a buffer all of one or more packets that are received during when the first process is processing the event and that are to be dispatched to the first process;

upon completion of the processing of the event by the first process, performing switching of a working process from the first process to the second process; and sending all of the one or more packets stored from start of the buffering in the buffer to the second process switched from the first process and stopping the buffering. According to a seventh aspect of the disclosure, there is provided a computer readable recording medium or non-transitory recording medium such as a semiconductor storage such as a read only memory (ROM), or a random access memory (RAM), or electrically and erasable programmable read only memory (EEPROM), a hard disk drive (HDD), a compact disk (CD) or a digital versatile disk (DVD) in which the program according to the sixth aspect of the disclosure is stored.

According to the present invention, it is possible to prevent an occurrence of inconsistency in a rollback of a process to ensure secure networking.

Still other features and advantages of the present invention will become readily apparent to those skilled in this art from the following detailed description in conjunction with the accompanying drawings wherein only example embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

The following describes example embodiments of the present invention.

Example Embodiment 1

Figure 1:
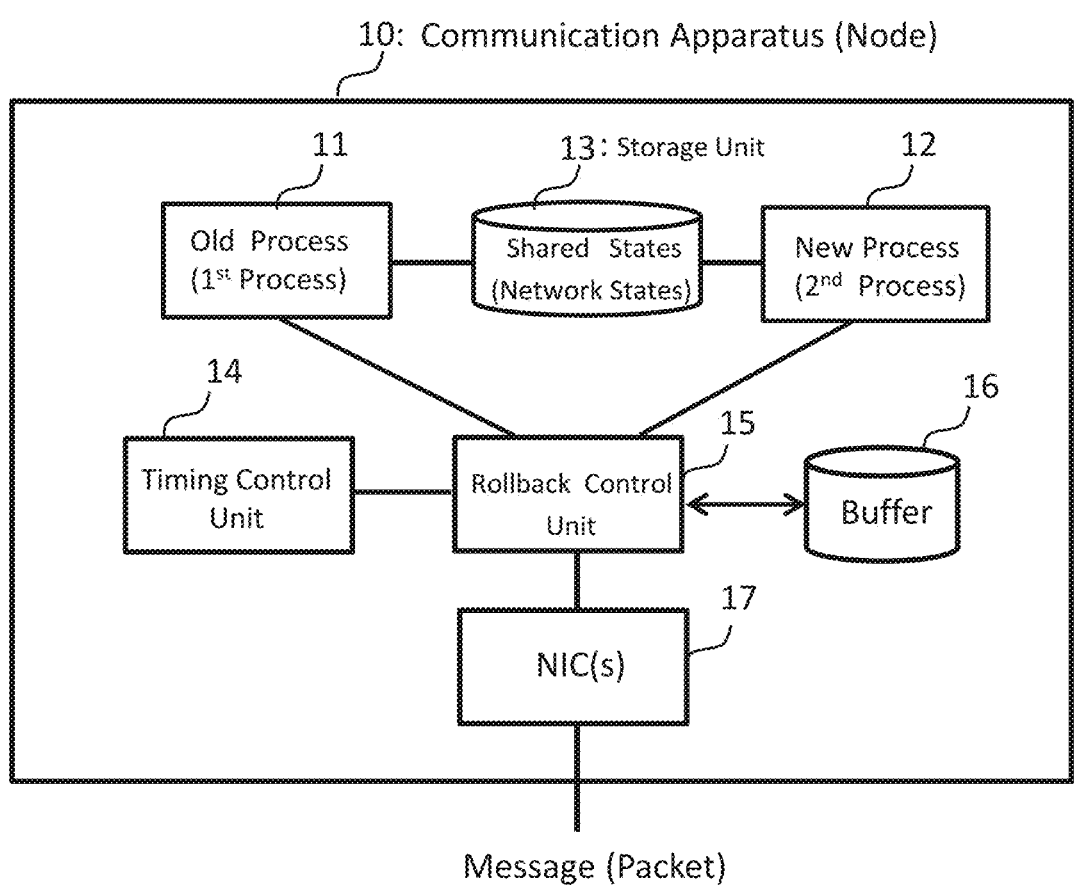
FIG. 1 is a diagram illustrating an arrangement of a communication apparatus in a first example embodiment of the present invention.

FIG. 1 illustrates a communication apparatus (network node) according to a first example embodiment. Referring to FIG. 1, the communication apparatus 10 includes a storage unit 13, a rollback control unit 15, a buffer 16, a timing control unit 14, and a network interface card(s) (network interface controller (s)) 17.

The rollback control unit 15 is configured to perform control to roll back a first process 11 to be rolled back, not to a previously saved process image, but to a second process 12 newly created. The functionality and operation of the second process 12 are the same as that of the first process 11.

In the embodiments, the rollback of a process may be implemented as a switching of a working from the first process 11 to be rolled back to the second process 12 newly created.

The rollback control unit 15 performs control to terminate the first process 11 after switching of a working process from the first process 11 to the second process 12. The first process 11 may be hereinafter denoted or referred to as "old process 11". The second process 12 newly created to roll back the first process 11 may be hereinafter denoted and referred to as "new process 12".

The storage unit 13 is shared by the old process 11 and the new process 12. More specifically, the old process 11 may read and update (write) a state(s), such as a network state(s) in the storage unit 13 until switching of a working process from the old process 11 to the new process 12, while the new process 12 may have only a read access right to the state(s) stored in the storage unit 13 in a time period as from the creation of the new process 12 until the switching of a working process from the old process 11 to the new process 12. The state(s) stored in the storage unit 13 can be shared by the new process 12 and the old process 11 in the time period as from the creation of the new process 12 until the switching from the old process 11 to the new process 12.

Thus, the storage unit 13 functions as a state sharing mechanism for allowing the new process 12 to take over a state(s) that is (are) stored in the storage unit 13 by the old process 11. That is, the new process 12 is enabled to obtain the most recent update of a state(s) stored in the storage unit 13, before a working process is switched from the old process 11 to the new process 12. After a working process is switched from the old process 11 to the new process 12, the new process 12 may read and write (update) a state(s) such as a network state(s), in the storage unit 13.

The timing control unit 14 is configured to control timing of the rollback operation by the rollback control unit 15. The timing control unit 14, for example, controls to wait for completion of event processing by the old process 11 to make a transaction atomic. Switching of a working process from the old process 11 to a new process 12 is postponed by the timing control unit 14 to a point of time when the event processing by the old process 11 is completed.

The buffer 16 has an event buffering function controlled to be enabled/disabled by the rollback control unit 15. The buffer 16 is enabled to store one or more events (packets) that are received by the NIC(s) 17 and destined to the old process 11 and, when the old process 11 to be rolled back is in process of handling an event.

More specifically, the rollback control unit 15, after creating the new process 12, when the old process 11 is in process of handling an event related with a packet received, controls to start event buffering such that the buffer 16 is set so as to store all of one or more packets that are received during when the old process 11 is processing the event and are destined to the old process 11. The buffer 16 may be configured to store incoming events (packets) in a FIFO (First-In First-Out) manner to keep an incoming order of the events.

The event buffering as started above may be terminated as follows.

When the processing of the event by the old process 11 is completed, under a control of the timing control unit 14, the rollback control unit 15 performs switching of a working process from the old process 11 to the new process 12, and the rollback control unit 15 controls to send all of one or more events that have been stored in the storage unit 13 from the start of the event buffering, to the new process 12 switched from the old process 11, and the rollback control unit 15 controls the buffer 16 to stop the event buffering. Then after, events received by the NIC(s) 17 and destined to the old process 11 are forwarded to the currently working new process 12, without being stored in the buffer 16.

Figure 16:
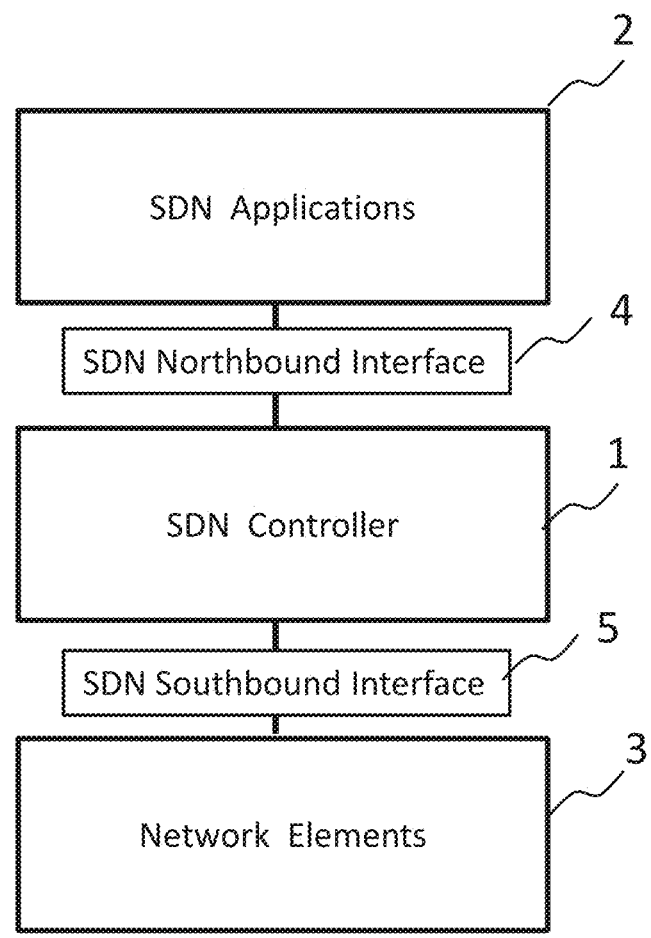
FIG. 16 is a diagram illustrating an SDN architecture.

The communication apparatus 10 may be configured, as an SDN controller, or a network element (a switch, a load balancer, or a firewall) of the SDN architecture described with reference to FIG. 16, though not limited thereto.

The arrangement illustrated in FIG. 1 makes it possible to prevent an occurrence of inconsistencies in the rollback of a process. The inconsistency during the rollback may include, for example, inconsistency between nodes, or inconsistency between a state in the node and an actual state, as described below.

If the old process 11 should happen to be rolled back to the new process 12 in the midst of execution of a processing for an event (for example, a Packet-In message) by the old process 11, the event processing by the old process 11 would not be completed and the event would be lost.

There may occur also an event loss, if a process cannot receive an event destined to the process during the rollback.

The event buffering mechanism according to the example embodiments serves to preserve event order and to prevent an occurrence of event loss to ensure consistency of events in the rollback operation.

As another types of inconsistencies in the rollback, there are inconsistencies in states. For example, assuming that a state(s) such as a network state(s) should be rolled back to a last saved state(s) which fail to reflect update done by the old process 11 during the rollback operation, the new process 12 would execute a processing on the basis of the last saved state(s) that does not reflect the update, which may result in wrong processing or malfunction.

According to the embodiments, the state sharing mechanism can contribute to avoid these disadvantages. The state sharing mechanism that allows the new process 12 to take over a latest state(s) that is (are) updated in the storage unit 13 by the old process 11 during the rollback, serves to prevent an occurrence of inconsistency between a state in the old process 11 and a state in the new process 12.

The new process 12 that takes over a state(s) (network state(s)) from the old process 11, using the storage unit 13, after the switching from the old process 11 to the new process 12, may perform delayed or gradual update of the state(s). Even if a state (s) that is (are) stored in the storage unit 13 and taken over by the old process 11 is (are) contaminated before the switching from the old process 11 to the new process 12, the state(s) may be gradually restored by the new process 12. For example, when a new state which is clean is generated in response to a new flow, the new process 12 may update the contaminated state with this new state (clean). The new process 12 may update a state(s) taken over from the old process 11 before the new process 12 uses the state(s). The new process 12 may update a state(s) taken over from the old process 11 probabilistically. By generating a random number (integer), the new process 12 may update a state(s) taken over from the old process 11 when the random number is in a predetermined range, or the random integer matches a predetermined integer. The new process 12 may update a state(s) taken over from the old process 11 in an idle state. In FIG. 1, the communication apparatus 10 may include a processor (s) that performs a processing by fetching and executing instructions of a computer program stored in a memory not shown. The old process 11 and the new process 12 may each be a process that runs on the processor. The rollback unit 15 and the timing control unit 14 may be implemented by computer programs executed by the processor. The communication apparatus 10 may be implemented as a server equipped with a virtualization mechanism such as a hypervisor that provides a server virtualization environment, where the old process 11 and the new process 12 may be configured to run on a virtual machine (VM).

Figure 2:
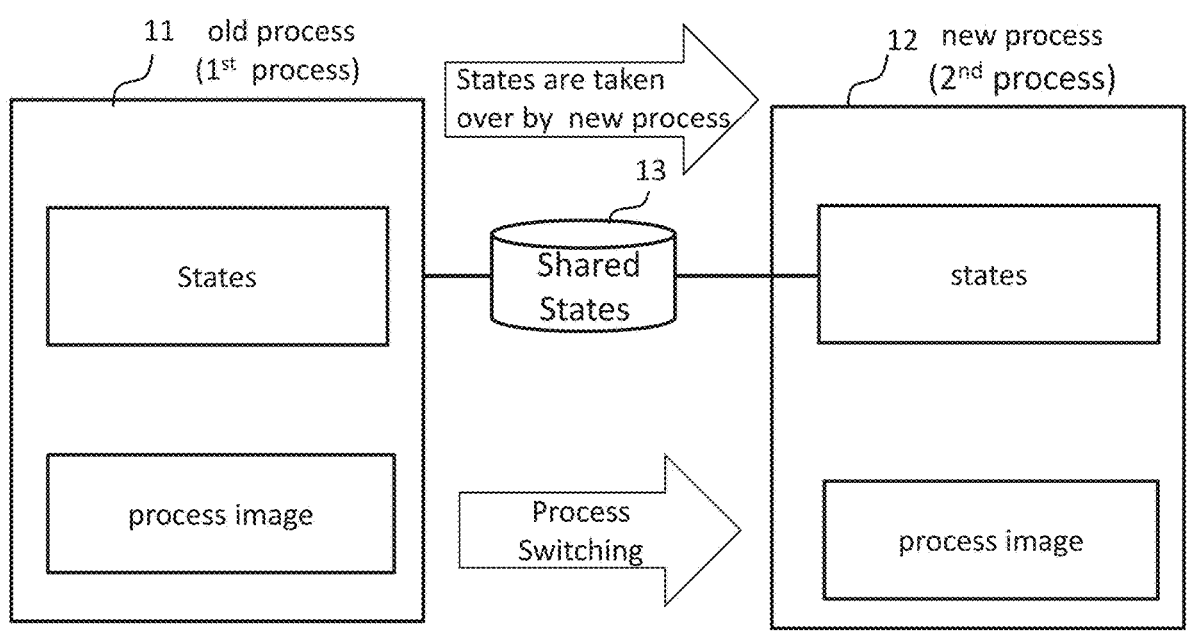
FIG. 2 is a diagram illustrating rollback in the first example embodiment of the present invention.

FIG. 2 schematically illustrates the rollback operation in FIG. 1. States (such as network states) in the storage unit 13 are shared by the old process 11 and the new process 12, as described above. Most recent network states updated by the old process 11 are taken over by the new process 12 after the creation thereof. A process image of the old process 11 is rolled back by a process switching to a process image of the new process 12. The process image allocated as a process in a virtual memory, for example, may include, for example,
program code (instructions to be executed),
program data,
stacks (a user stack and a kernel stack), and
process control blocks (information needed by an operating system to manage the process). The old process 11 and the new process 12 may be also regarded as a redundant configuration, wherein a system in which an active process and a waiting process are respectively the old process 11 and the new process 12 is switched to a system in which an active process and a waiting process are respectively the new process 12 and the old process 11.

Figure 3A:
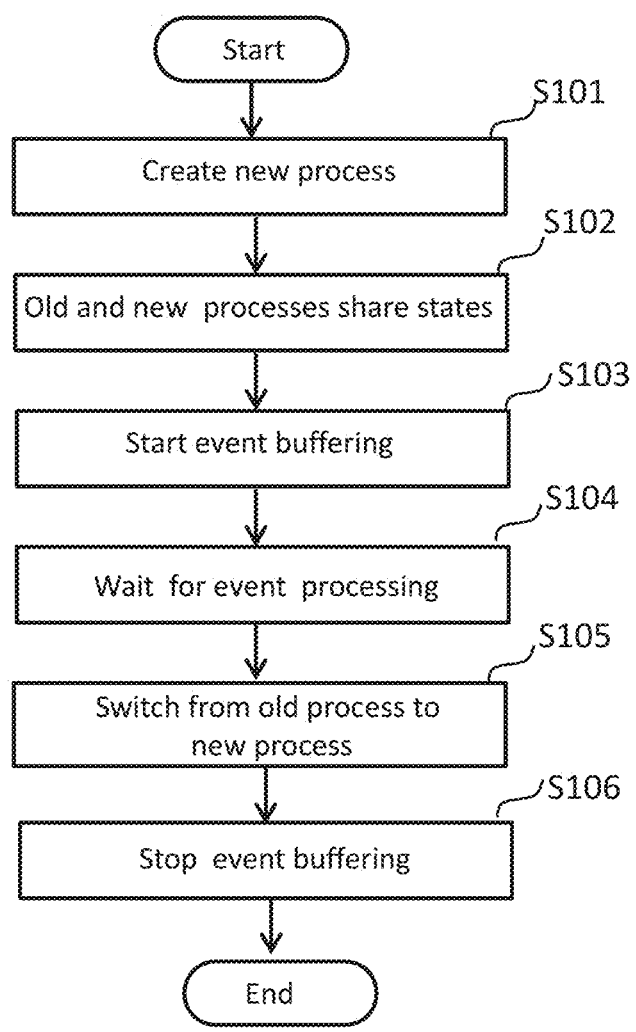
FIG. 3A is a flow chart illustrating an example of rollback operation in the first example embodiment of the present invention.
Figure 3B:
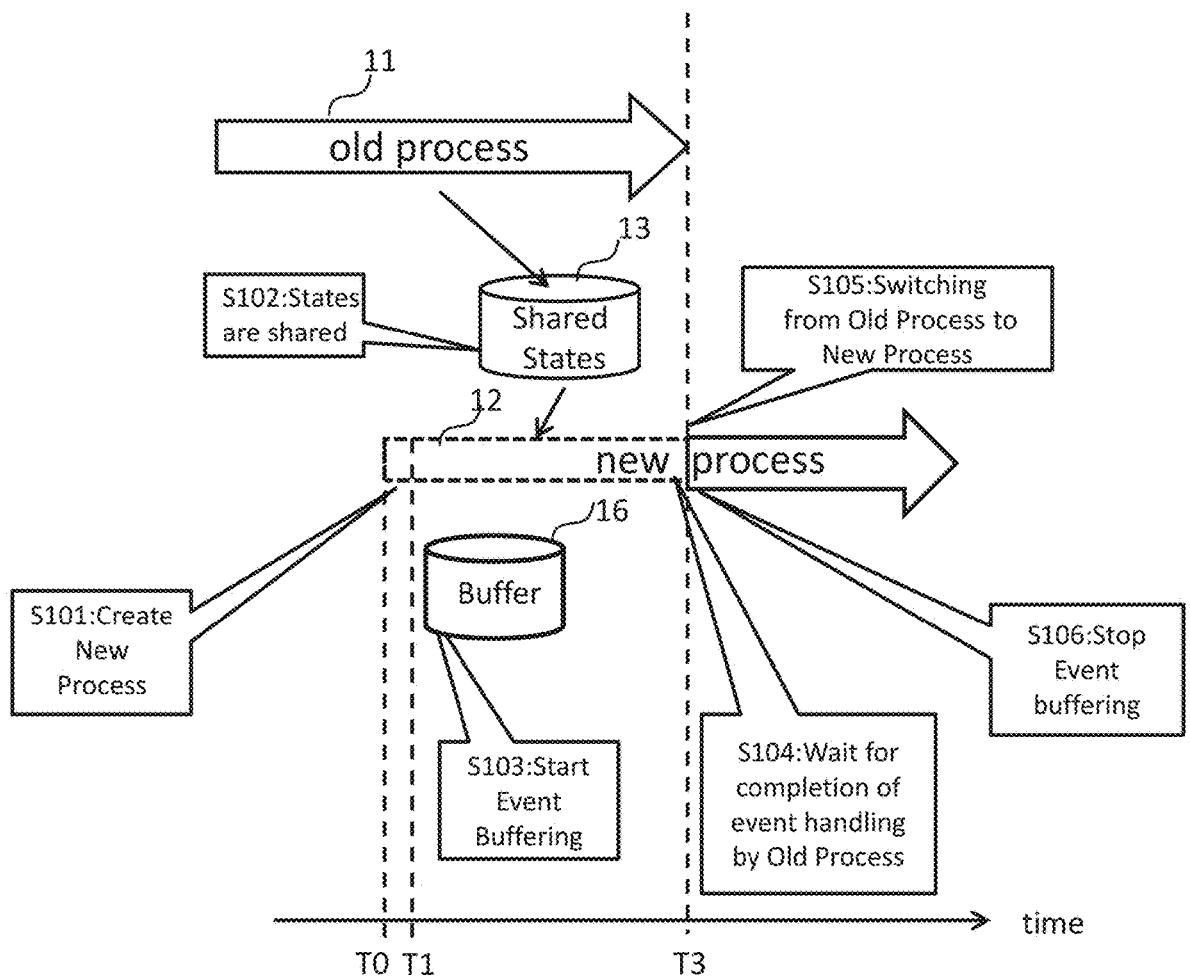
FIG. 3B is a diagram illustrating an operation of FIG. 3A.

FIG. 3A illustrates an operation of the rollback control unit in FIG. 1. FIG. 3B schematically illustrates the steps of FIG. 3A in a sequence of time.

The rollback unit 15 creates the new process 12 (S101) (at a timing T0 in FIG. 3B).

States such as network states are shared by the old process 11 and the new process 12 (S102). When the old process 11 creates or updates one or more states, the old process 11 stores the one or more states in the storage unit 13 and the new process 12 can read the one or more states.

When the old process 11 as a working process is in process of executing event handling, the rollback control unit 15 starts event buffering (S103) (at a timing T1 in FIG. 3B). The timing T1 may be the same to the timing T0. One or more packets destined to the old process 11 are buffered in the buffer 16.

In accordance with an instruction from the timing control unit 14, the rollback control unit 15 waits for the completion of the event processing by the old process 11 (S104).

When the old process 11 completes the event handling, the rollback control unit 15 performs switching from the old process 11 to the new process 12 (S105) (at a timing T3 in FIG. 3B).

The rollback control unit 15 terminates the event buffering to direct an event received to the new process 12 (S106).

Figure 15:
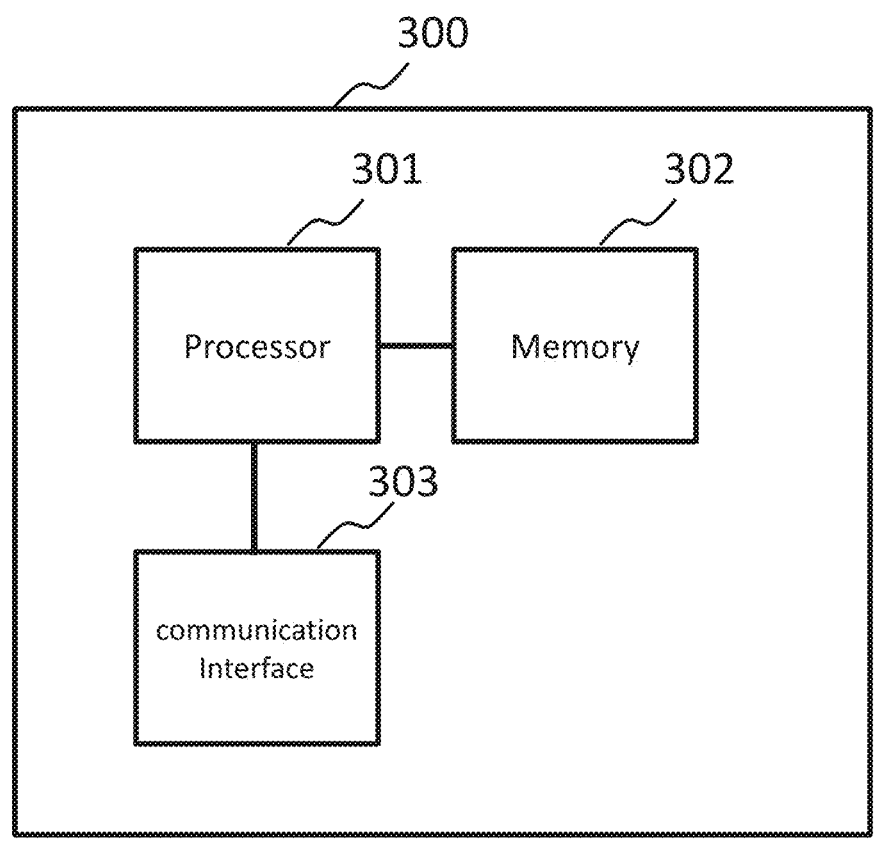
FIG. 15 is a diagram illustrating a server computer.

FIG. 15 illustrates a computer system that implements the function of the computer apparatus as described with reference to FIG. 1. The computer system 300 such as a server system includes a processor 301, a storage 302 including at least one of a random access memory, a hard disk drive (HDD), a solid state drive (SSD), a compact disk (CD), a digital versatile disk (DVD), or an electrically erasable and programmable read only memory (EEPROM) that stores a program(s), and a communication interface 303.

The buffer 16 and the storage unit 13 in FIG. 1 may be implemented by the storage 302. The processor 301 executes a program(s) stored in the storage 302 that implements the functions of the rollback unit 15, the timing control unit 14, the old process 11, the new process 12 to make the computer system 300 function as the communication apparatus 10 of FIG. 1.

Example Embodiment 2

Figure 4:
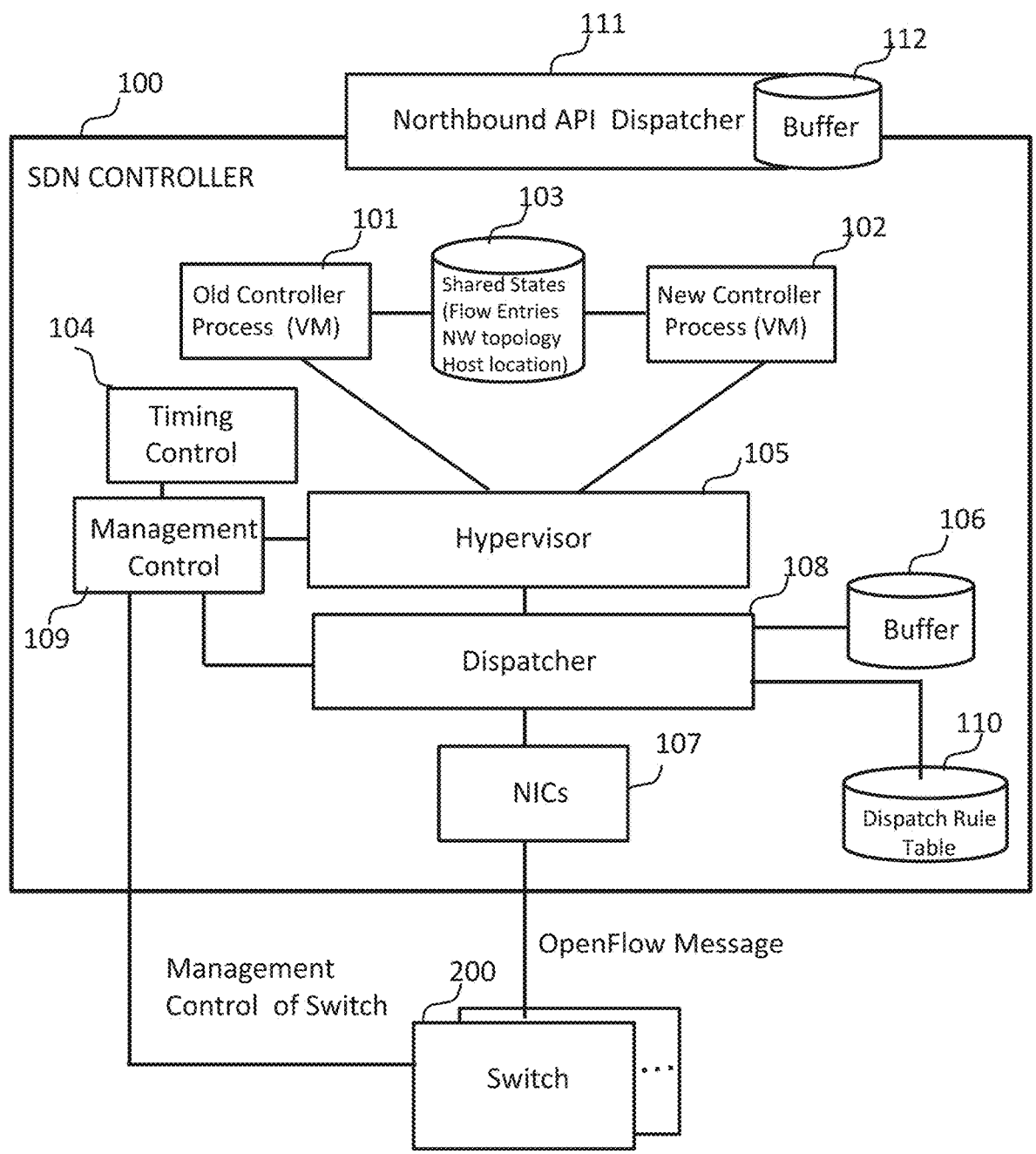
FIG. 4 is a diagram illustrating an arrangement of a controller in a second example embodiment of the present invention.

FIG. 4 illustrates a configuration of a controller in an SDN architecture, according to a second example embodiment. In the second example embodiment, the communication apparatus 10 in FIG. 1 is applied to an SDN controller. Referring to FIG. 4, an SDN controller 100 may be configured on a computer system such as a server computer and includes an old controller process 101 (1st controller process), a new controller process 102 (2nd controller process), and a storage unit 103 to store a state(s) such as a network state(s) that is shared by the old controller process 101 and the new controller process 102. In FIG. 4, the old controller process 101, the new controller process 102, the storage unit 103 and a buffer 106 may correspond respectively to the old process 11, the new process 12, the storage unit 13 and the buffer 16 in FIG. 1. A timing control unit 104, a hypervisor 105 and NIC(s) 107 may correspond respectively to the timing control unit 14, the rollback control unit 15 and the NIC(s) 17. The state(s) stored in the storage unit 103 and shared by the old controller process 101 and the new controller process 102 include network topology, flow entries, and host location information, though not limited thereto.

The SDN controller 100 further includes a hypervisor 105 (virtual machine monitor) that implements a server virtualization infrastructure to provide hardware virtualization to a virtual machine (VM). The hypervisor 105 includes a computer software, firmware or hardware and adapted to control hardware resources. Though not limited thereto, in such an application to server virtualization, the hypervisor 105 may control a virtual machine (VM) including: virtualized hardware resources, a guest OS and an application, wherein the virtualized hardware resources include virtualized CPU (Central Processing Unit), a virtualized storage, and a virtualized network, for example.

The old controller process 101 and the new controller process 102 are respectively executed on virtual machines (VMs) created by the hypervisor 105. The hypervisor 105 allocates one or more virtual CPUs (Central Processing Units), a virtual storage, and a virtual network to a virtual machine.

A controller process adapted to run on the virtual machine may function as a virtual SDN controller. The controller process, for example, computes a path for a relevant packet on reception of a Packet-In message from a switch 200 (OpenFlow Switch: OFS), and generates a flow entry for each of switches 200 on the path to set the generated flow entry for each switch 200 of the path by using a Flow-Mod message.

The SDN controller 100 further includes a dispatcher 108 that dispatches a packet or an OpenFlow message received from the switch 200 to a target controller process, based on a dispatch rule stored in a dispatch rule table 110. The controller process may serve as a network control proxy for a networking control module. In this case, the dispatcher 108 which selects a target controller process serves as a proxy of a network control.

The dispatch rule in the dispatch rule table 110 defines an association (mapping) between a matching condition (flow information item) for a received packet and a target controller process to which the received packet or message corresponding to the matching condition is to be dispatched. The dispatcher 108 compares header field information of a received packet with the matching condition (flow information item) in the dispatch rule and dispatches the received packet to the target controller process associated with the matching condition that the header field information of the received packet matches. The matching condition to be mapped to the target controller process in the dispatch rule may include:

destination or source IP (Internet Protocol) address, destination or source MAC (Media Access Control) address, TCP (Transmission Control Protocol)/UDP (User Datagram Protocol) destination or source port number, or combination of at least two items of the above, or a physical port number of the controller 100 by which the packet has been received.

Since a controller process runs on a virtual machine (VM), a virtual IP address or a virtual MAC address virtually allocated to a virtual machine (VM) is used. The dispatcher 108 retrieves in the dispatch rule table header field information of the received packet and when the dispatch rule whose matching condition matches the header field information of the received packet is found, the dispatcher 108 forwards the received packet to the corresponding target controller process. If no dispatch rule whose matching condition matches the header field information of the received packet is found, the dispatcher 108 may discard the received packet, or a new dispatch rule for the received packet may be created by a maintenance and management terminal not shown for example.

The dispatcher 108 may include a plurality of input ports (not shown), and a plurality of output ports (not shown), and forwards a packet received at an input port thereof to a target output port thereof, based on a dispatch rule that defines a correspondence between a matching condition for a packet received and a controller process to which a received packet corresponding to the matching condition is to be dispatched. The dispatcher 108 may be configured by a hardware switch with a controller, or by a virtual switch implemented by software. It is noted that although the dispatcher 108 is arranged in front of the hypervisor 105 in FIG. 2, there may be provided another configuration in which the dispatcher 108 is configured as a virtual switch controlled by the hypervisor 105 and is disposed between the hypervisor 105 and the controller process that runs on a virtual machine. The dispatcher 108 may relay the packet or the message using Inter-Process Communication such as socket (Unix (registered trade mark) socket, network socket), PIPE, shared memory.

The SDN controller 100 further includes a buffer 106 connected to the dispatcher 108. The buffer 106 stores one or more events (for example, one or more OpenFlow messages) that are received from a switch 200 and are to be dispatched to the old controller process 101, when the old controller process 101 is executing a processing of an event during the rollback. When the old controller process 101 completes the processing in process, the one or more events that have been hitherto buffered in the buffer 106 are taken out and dispatched by the dispatcher 108 to the new controller process 102. The buffer 106 may include a FIFO (First In and First Out) memory. In FIG. 4, the buffer 106 is connected to the dispatcher 108, but the buffer 106 may be configured in the dispatcher 108 to store a packet before the packet is being dispatched in an event buffering mode.

The SDN controller 100 further includes a timing control unit 104 and a management control unit 109. The timing control unit 104 controls a timing of execution of buffering of an event received from the switch 200 into the buffer 106, when the old controller process 101 is executing a processing of an event during the rollback, and also controls a timing of switching from the old controller process 101 to the new controller process 102, in the roll back.

The management control unit 109 manages the controller process via the hypervisor 105. The management control unit 109 is connected to the timing control unit 104 and the hypervisor 105 and the dispatcher 108. The management control unit 109 performs, for example, resource management such as resource reservation and release; lifecycle management such as instantiation, startup and termination; and performance management such as scale-up/scale-down or scale-in/scale-out, for the virtual machine and controller process. The management control unit 109 is also connected to a management control unit in the switch 200.

There are provided NICs 107 to communicate with one or more switches to receive/send a message from/to the switches 200.

There is also provided a Northbound API (Application Programming Interface) dispatcher 111 with a buffer 112. A Northbound application (2 in FIG. 16) is allowed to manipulate topology among nodes, through a Northbound API. The Northbound API may include an API for referencing host information connected to a switch, an API for direct manipulation of flow entries, an API for referencing switch device information and so forth, though not limited thereto. The Northbound API dispatcher 111 dispatches a north bound API request to the controller process that includes a Northbound API not shown. The Northbound API may be arranged between the controller process and the Northbound API dispatcher 111. The Northbound API dispatcher 111 may serve as a proxy to an SDN controller module such as SDN applications.

The buffer 112 stores temporally one or more Northbound API requests to be dispatched to the old controller process 101 in a FIFO manner, when the old controller process 101 is executing a processing of an event during the rollback. When the old controller process 101 completes the processing, the one or more Northbound API requests buffered in the buffer 112 are taken out and forwarded by the north bound API 111 to the new controller process 102.

The hypervisor 105 controls rollback. The rollback control unit 15 in FIG. 1 may be implemented as a controller in the hypervisor 105. In the rollback, the hypervisor 105 creates and starts the new controller process 102. States in the storage unit 103 are shared by the old controller process 101 and the new controller process 102. States include for example, flow entries, network topology, and host location information, though not limited thereto.

When the old controller process 101 is handling an event during the rollback, the dispatcher 108 does not dispatch one or more incoming packets of OpenFlow messages (events) such as a Packet-In message or a Flow-Removed message (a message to notify to the controller that a life-cycle of a flow entry in a switch is expired) that are received from a switch(s) and destined to the old controller process 101, but stores the one or more incoming packets temporally in the buffer 106. In this case, one or more incoming Northbound API requests from the Northbound application destined to the old controller process 101 are also stored temporally in the buffer 112.

Under a control by the timing control unit 104, when the old controller process 101 finishes the handling of the event, the hypervisor 105 terminates the old controller process 101.

The dispatcher 108 forwards the one or more OpenFlow messages (events) stored in the buffer 106 to the new controller process 102. The one or more Northbound API requests stored in the buffer 112 are also routed to the new controller process 102.

The dispatcher 108 updates contents of a dispatch rule in the dispatch rule table 110 that defines an association between a matching condition for a packet and a controller process to which a received packet corresponding to the matching condition is to be dispatched. The dispatcher 108 changes the old controller process 101 defined as a target controller process in the dispatch rule table 110 to the new controller process 102.

The hypervisor 105 may perform rollback of the controller process,
after the controller process handles a request from the switch;
after handling one operation,
periodically, or,
responsive to an occurrence of a predetermined event for triggering rollback. The event for triggering rollback includes a detection of contamination of the controller process by using an integrity check, for example.

Figure 5:
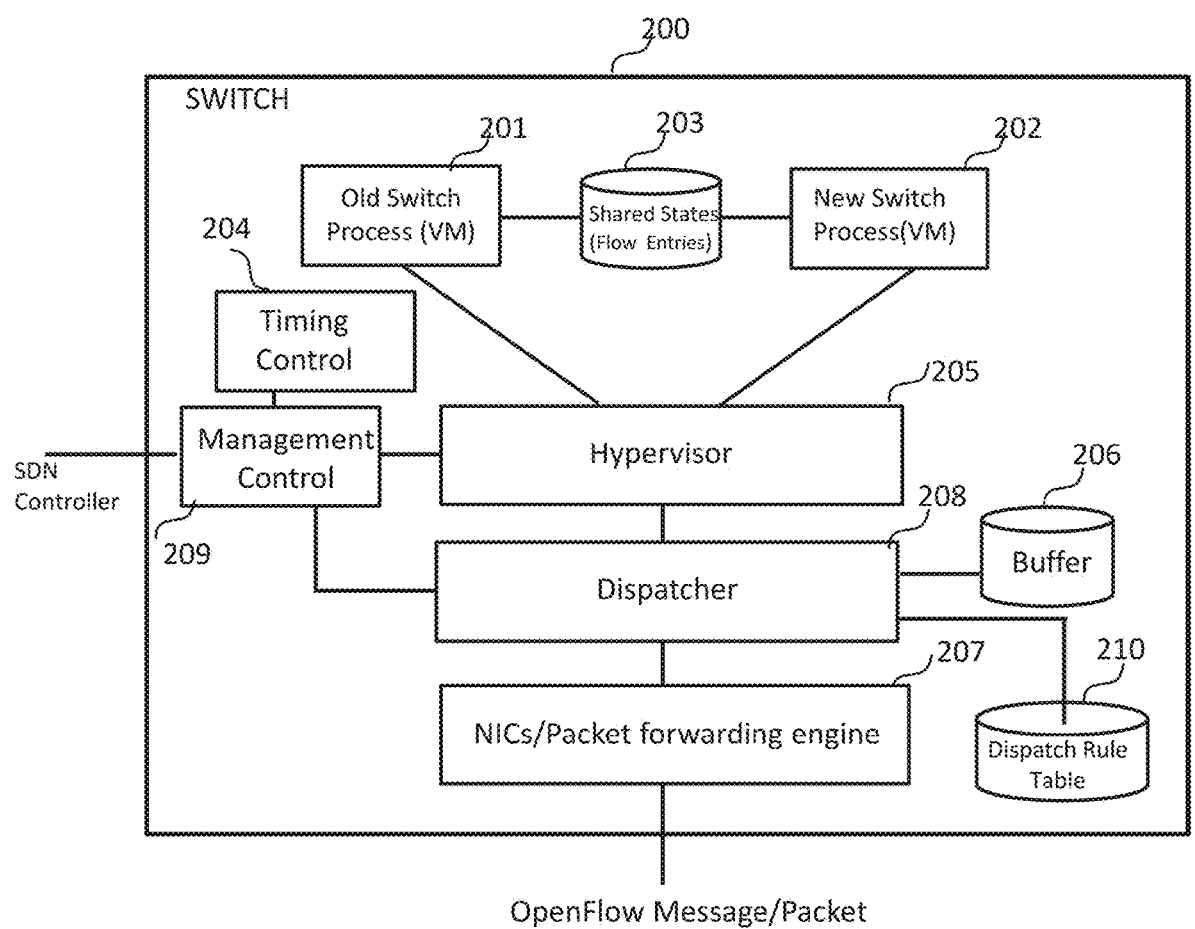
FIG. 5 is a diagram illustrating an arrangement of a switch in the second example embodiment of the present invention.

FIG. 5 illustrates a configuration of a switch according to a second example embodiment. The switch 200 in FIG. 5 corresponds to the switch 200 (OpenFlow Switch). Referring to FIG. 5, the switch 200 is configured on a server computer and includes an old switch process 201 (1st switch process), a new switch process 202 (2nd switch process), and a storage unit 203 to store a state(s) that are shared by the old process 201 and the new switch process 202. In FIG. 5, the old switch process 201, the new switch process 202, the storage unit 203 and a buffer 206 may correspond respectively to the old process 11, the new process 12, the storage unit 13 and the buffer 16 in FIG. 1. A timing control unit 204, a hypervisor 205 and NIC(s) of NIC(s)/Packet forwarding engine 207 may correspond respectively to the timing control unit 14, the rollback control unit 15 and the NIC(s) 17. The state(s) stored in the storage unit 203 and shared by the old switch process 201 and the new switch process 202 include flow entries.

The switch 200 includes a hypervisor 205 (virtual machine monitor). The old switch process 201 and the new switch process 202 may be respectively executed on virtual machines (VMs) created by the hypervisor 205. The hypervisor 205 may allocate one or more virtual CPUs (Central Processing Units), a virtual storage, and a virtual network to a virtual machine. A switch process that runs on the virtual machine functions as an OpenFlow switch described in the above.

The switch 200 further includes a dispatcher 208 that dispatches a packet (from another switch or a network node) or an OpenFlow message (from the packet forwarding engine 207). The dispatcher 208 also dispatches an Open-Flow message such as a Packet-Out message and a Flow-Mod message received from a controller to a target switch process, based on a dispatch rule stored in a dispatch rule table 210. The dispatch rule in the dispatch rule table 210 defines an association (mapping) between a matching condition (flow information item) and a target switch process to which a received packet or message corresponding to the matching condition (flow information item) is to be dispatched. The dispatcher 208 compares header field information of a received packet with the matching condition (flow information item) in the dispatch rule and dispatches the received packet to the target switch process associated with the matching condition that the header field information of the received packet matches. The matching condition to be mapped to the target switch process in the dispatch rule may include:

destination or source IP (Internet Protocol) address,
destination or source MAC (Media Access Control) address,
TCP (Transmission Control Protocol)/UDP (User Datagram Protocol) destination or source port number, or
combination of at least two items of the above, or
a physical port number of the switch 200 by which the packet has been received.

Since a switch process runs on a virtual machine (VM), a virtual IP address or a virtual MAC address virtually allocated to a virtual machine (VM) is used. The dispatcher 208 retrieves in the dispatch rule table 210 header field information of the received packet, and when the dispatch rule whose matching condition matches the header field information of the received packet is found, the dispatcher 208 forwards the received packet to the corresponding target switch process defined in the dispatch rule. It is noted that although the dispatcher 208 is arranged in front of the hypervisor 205 in FIG. 5, another configuration may be also adopted in which the dispatcher 208 is provided as a virtual hardware resource such as a virtual switch by the hypervisor 205. The dispatcher 208 may relay the packet or the message using Inter-Process Communication such as socket (Unix (registered trademark) socket, network socket), PIPE, shared memory.

The dispatcher 208 may be configured by a hardware switch with a controller, or by a virtual switch implemented by software. It is noted that although the dispatcher 208 is arranged between the NICs 207 and the hypervisor 205 in FIG. 5, there may be provided another configuration in which the dispatcher 208 is configured as a virtual switch controlled by the hypervisor 208 and the dispatcher 208 may be disposed between the hypervisor 205 and the controller process.

The switch 200 further includes a buffer 206 connected to the dispatcher 208. The buffer 206 stores one or more events (for example, OpenFlow messages) that are received from a switch and are to be dispatched to the old switch process 201 in a FIFO manner to preserve the order of the events, when the old switch process 201 is executing a processing of an event during the rollback. When the old switch process 201 completes the processing in process, the one or more events that have been hitherto buffered in the buffer 206 are taken out and dispatched by the dispatcher 208 to the new switch process 202.

The switch 200 further includes a timing control unit 204 and a management control unit 209. The timing control unit 204 controls a timing of execution of buffering of an event (packet) received from a switch into the buffer 206, when the old switch process 201 is executing a processing of an event during the rollback, and also controls a timing of switching from the old switch process 201 to the new switch process 202, in the roll back.

The management control unit 209 manages the controller process via the hypervisor 205. The management control unit 209 is connected to the timing control unit 204 and the hypervisor 205 and the dispatcher 108. The management control unit 209 performs, for example, resource management such as resource reservation and release; lifecycle management such as instantiation, startup and termination; and performance management such as scale-up/scale-down or scale-in/scale-out, for the virtual machine and controller process. The management control unit 209 is also connected to a management control unit in the switch.

In FIG. 5, NICs/Packet forwarding engine 207 communicates with other switch(s) and an SDN controller to receive/send a message and a packet from the other switch(s) and the SDN controller. Packet forwarding engine is an engine designated to a packet forward processing of a packet based on a flow entry. The NICs may be configured a plurality of a single port NICs or a multi-port NIC.

The rollback control unit 15 in FIG. 1 may be implemented as a controller in the hypervisor 205. The hypervisor 205 controls rollback as follows.

In the rollback process, the hypervisor 205 creates and starts (activates) the new switch process 202. States in the storage unit 203 are shared by the old switch process 201 and the new switch process 202. States include for example, flow entries, though not limited thereto.

When the old switch process 201 is handling an event during the rollback, the dispatcher 208 does not forward one or more incoming OpenFlow messages (events) that are received from another switch or an SDN controller and destined to the old switch process 201, and the one or more incoming OpenFlow messages (events) are stored temporally in the buffer 206. In the buffer 206, packets forwarded from another switch and an OpenFlow message such as a Flow-Mod message sent from an SDN controller are temporally stored until the completion of the event handling by the old switch process.

When the old switch process 201 finishes the handling of the event, the hypervisor 205 terminates the old switch process 201 under a control by the timing control unit 204.

The dispatcher 208 forwards the one or more OpenFlow messages (events) stored in the buffer 206 to the new switch process 202.

Figure 10:
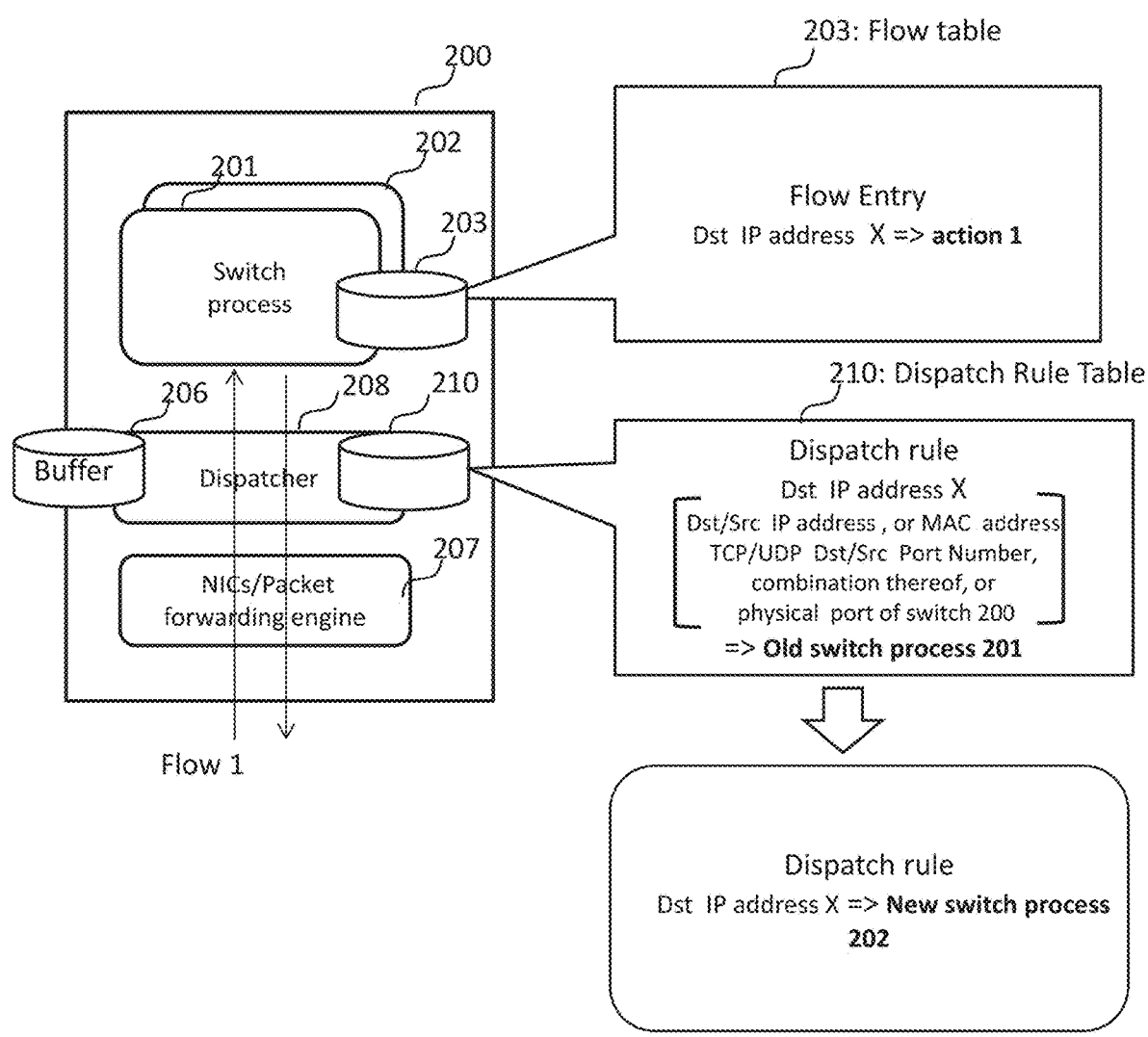
FIG. 10 is a diagram illustrating a dispatch table of the switch in the second example embodiment.

The dispatcher 208 updates contents of a dispatch rule in the dispatch rule table 210, as illustrated in FIG. 10. The dispatcher 208 changes a dispatch rule in the dispatch rule table 210 from Destination IP address X →Old switch process 201 to Destination IP address X →New switch process 202. When a packet with a destination IP address field of a packet header being X, is received, the packet is dispatched to the new switch process 202. Referring to FIG. 10, the switch process 201, upon reception of a packet dispatched thereto by the dispatcher 208, matches header field information of the packet with a flow entry in the flow table 203 for the switch process 201. The flow entry of the flow table 203 for the switch process 201 includes a match field that is matched with header field information of a packet received; and an action field that prescribes handling of a packet matching. The flow entry in FIG. 10 defines a rule that if a destination IP address of a header of a received packet is X, then the switch process 201 performs action 1. A matching condition in the dispatch rule in the dispatch table 210 is as a matter of course not limited to a destination IP address of a header of a received packet. The matching condition in the dispatch rule may be configured to include, destination/source IP address, destination or source MAC address, TCP/UDP destination or source port number, or combination of at least two items of the above. So does a match field of the flow entry in the flow table 203. The matching condition in the dispatch rule may include a port number of the switch 200 by which the packet has been received.

When the dispatcher 208 receives a Packet-In message handed out by the packet forwarding engine 207, since the Packet-In message includes a first packet, the dispatcher 208 dispatches the Packet-In message to a target switch process with reference to header field information of the first packet and the target switch process transfers the Packet-in message to a controller.

The hypervisor 205 may perform rollback of the controller process,
after the switch process handles a message from the SDN controller;
after handling one operation,
periodically, or,
responsive to an occurrence of a predetermined event for triggering rollback. The event for triggering rollback includes a detection of contamination of the switch process by using an integrity check, for example. The hypervisor 205 may also perform rollback of the switch process, every time the switch process handling one or N flows, wherein N is a predetermined integer number not less than 2, or, responsive to an occurrence of a predetermined event for triggering rollback. The switch process that runs on a virtual machine under the control of the hypervisor 205 in FIG. 5 and the controller process that runs on a virtual machine under the control of the hypervisor 105 in FIG. 4 may be provided on the same server computer with the hypervisor 205 and the hypervisor being implemented as the unified hypervisor.

Figure 6:
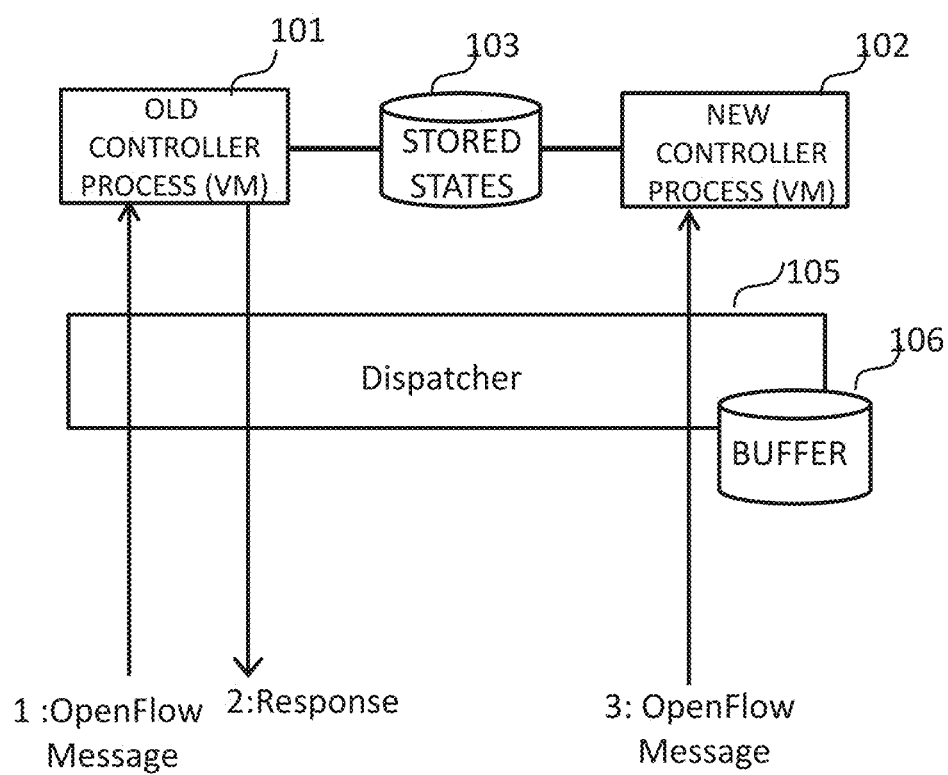
FIG. 6 is a diagram illustrating rollback in the second example embodiment of the present invention.

FIG. 6 illustrates rollback in the controller of FIG. 4. In order to make a result of the event atomic, the rollback (switching from the old controller process 101 to the new controller process 102) is performed when the old controller process 101 finishes event processing. Moreover, the old process 11 is terminated after the old process 11 completes the event processing. In an example of FIG. 6, OpenFlow message (event 1) is dispatched to the old process 11 and the old process 11 returns a response (2) with the completion of the event processing of the OpenFlow message. After the completion of the event processing, a new event (3) is dispatched to the new process 12.

Figure 7:
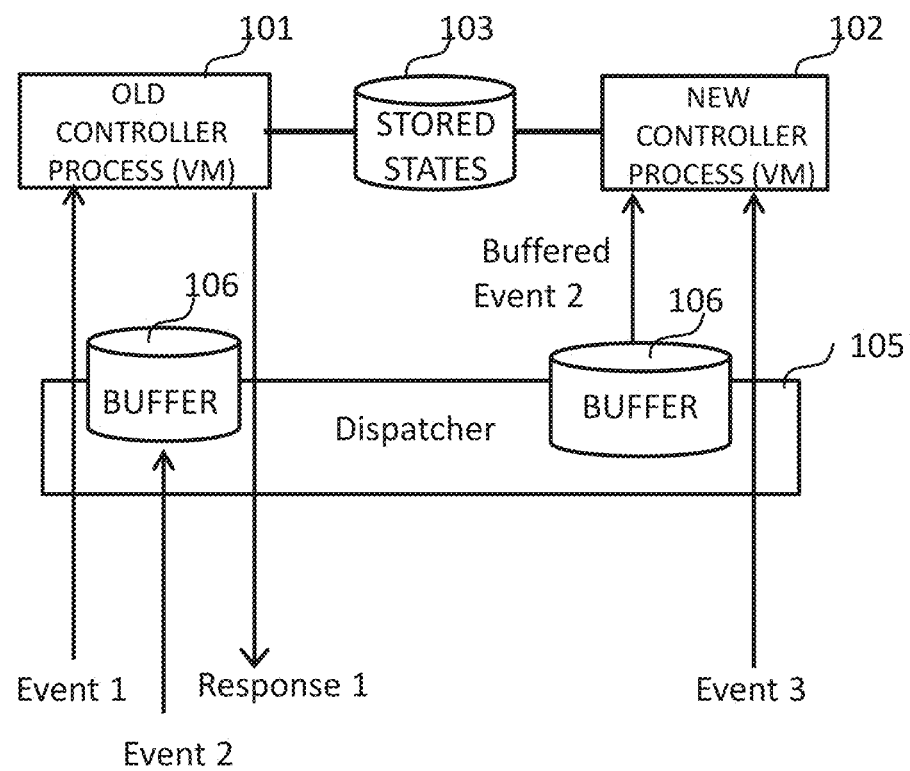
FIG. 7 is a diagram illustrating event buffering in the roll back in the second example embodiment of the present invention.

FIG. 7 illustrates an event buffering in rollback according to the present embodiment. In order to prevent event loss during the rollback, a buffer 106 for event buffering is provided. Event buffering is performed during when an event is being processed by the old process 11.

In an example of FIG. 7, an event 2 received when an event 1 is being processed by the old process 11 is buffered in the buffer 106. After the completion of processing of the event 1, that is, a response of processing of the event 1 by the old process 11 is output, the buffered event 2 is sent to the new process 12. Thus, event loss can be prevented. The buffer 106 may be configured as a FIFO type buffer. The event buffering mechanism in FIG. 7, as a matter of course, may well apply to the switch 200 described with reference to FIG. 5.

Figure 8:
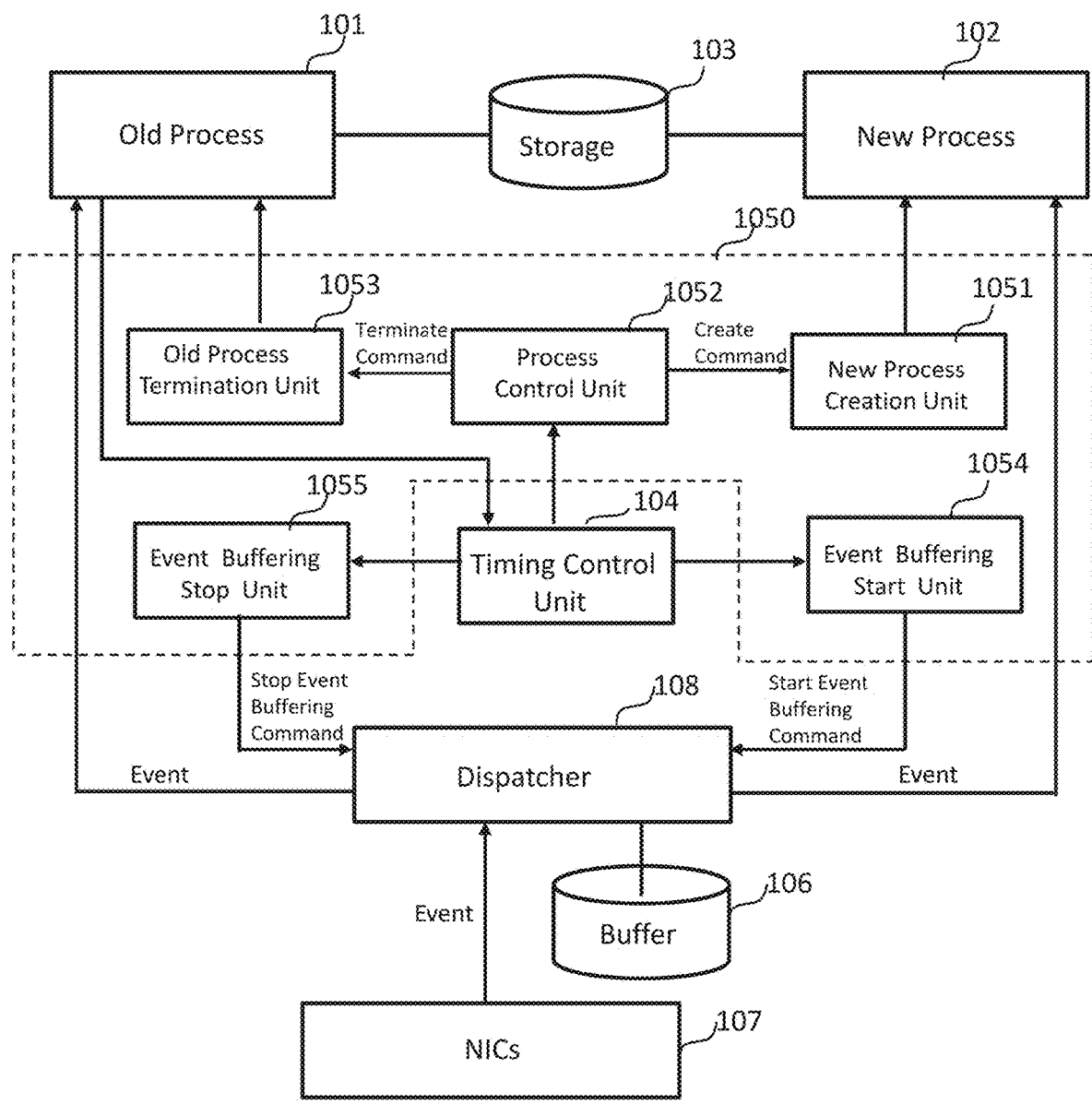
FIG. 8 is a diagram illustrating a configuration of the rollback control unit (hypervisor) in the second example embodiment of the present invention.

FIG. 8 illustrates an example of the rollback control unit 1050 implemented in the hypervisor 105 of the SDN controller 100 of FIG. 4. Referring to FIG. 8, the rollback control unit 1050 includes a new process creation unit 1051, a process switching unit 1052, an old process termination unit 1053, an event buffering start unit 1054, and an event buffering stop unit 1054. The hypervisor 205 in the switch 200 of FIG. 5 may include a rollback control unit configured in the same arrangement as illustrated in FIG. 8.

Figure 9:
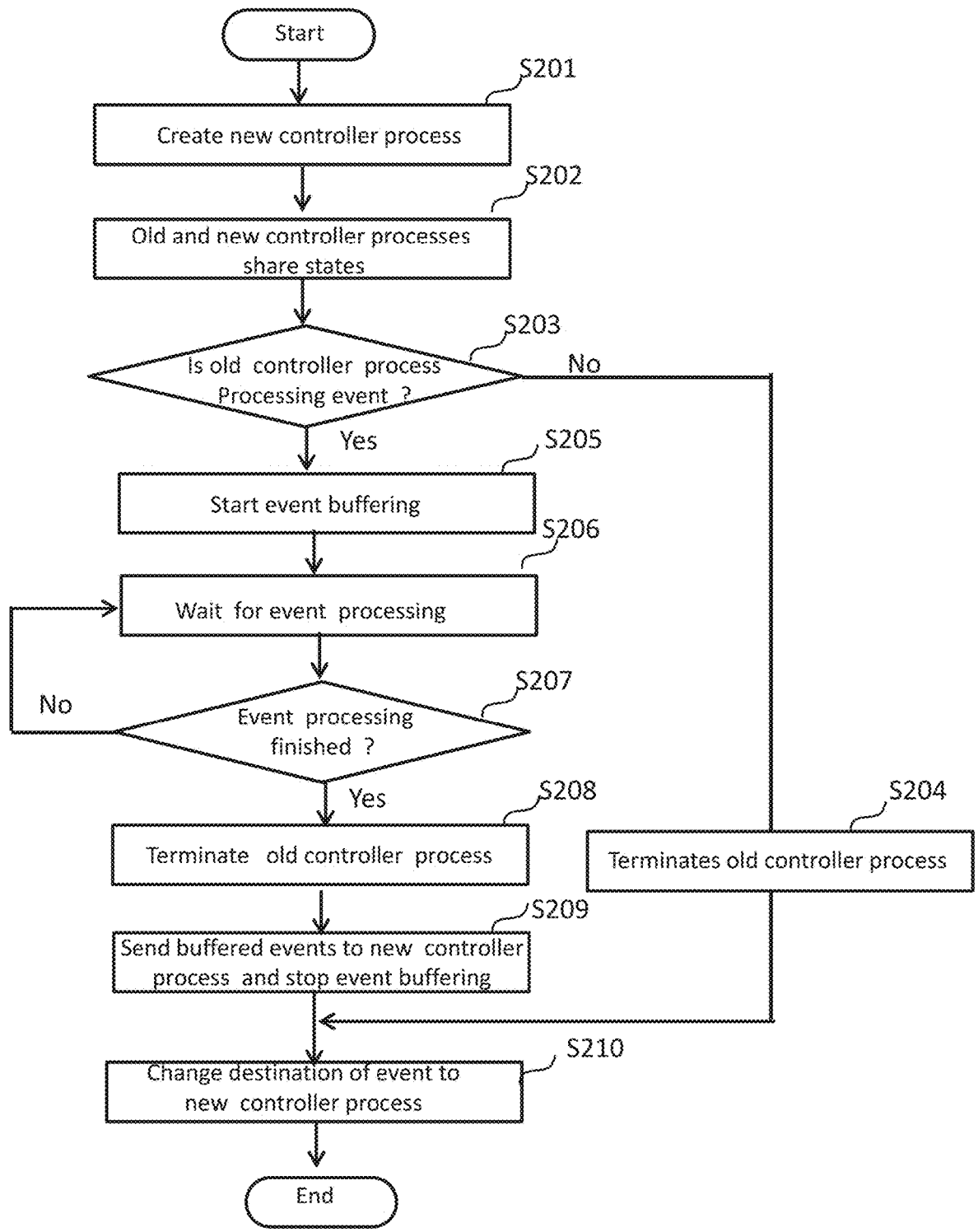
FIG. 9 is a diagram illustrating a rollback operation in the second example embodiment of the present invention.

FIG. 9 illustrates an operation of the rollback control unit implemented in the hypervisor 105 of FIG. 8. Referring to FIG. 9, when a rollback is initiated, the new process creation unit 1051 creates a new controller process 102 (S201). The hypervisor 105 may be configured to initiate the roll back on detection of a contamination of the old controller process 101, based on a measurement of a system-integrity. Or, the hypervisor 105 may be configured to initiate the roll back based on a command issued from a maintenance and management terminal (not shown) connected to the SDN controller. Though not limited thereto, the new process creation unit 1051 may create a new controller process 102, as a standby process, while the old controller process 101 is a current working process. That is, while the old controller process 101 is being in an active state (execution state), the new controller process 102 may be kept in a waiting state in a transition diagram of a process.

The old controller process 101 and the new controller process 102 share the storage unit 103 in which the states such as network topology, flow entries of the switches, host location information (information on hosts connected to ports of the switches) or the like are stored (S202). The new controller process 102 is enabled to take over most recent states stored in the storage unit 103 before switching of a working process to the new controller process 102, that is, before a state of the new controller process 102 is transitioned to an active state (execution state) of a state transition diagram of the process.

If the old controller process 101 is not processing event processing (S203, "No" branch), the old process termination unit 1053 terminates the old process and the new controller process 102 becomes working process.

If the old controller process 101 is decided to be in the midst of event processing (S203, "Yes" branch), the event buffering start unit 1054 starts the event buffering (S205).

Under the control of the timing control unit 104, the completion of the event handling by the old controller process 101 is waited for (S206-S207).

When the event handling by the old controller process 101 is completed, the old process termination unit 1053 terminates the old process and the new controller process 102 becomes working process (S208).

The event buffer stop unit 1055 performs control to cause the dispatcher 108 to send one or more events destined to the old controller process 10 that have been received from the start of the event buffering, and stored in the buffer 106, to the new controller process 102, and then stops the event buffering (S209).

The dispatcher 108 changes a target controller process field associated with the matching condition in the dispatch rule from the old controller process 101 to the new controller process 102 (S210). From now on, an event received is dispatched by the dispatcher 108 to the new controller process 102.

The hypervisor 205 in the switch 200 of FIG. 5 may be configured to operate in the same manner as illustrated in FIG. 9.

Example Embodiment 3

Figure 11:
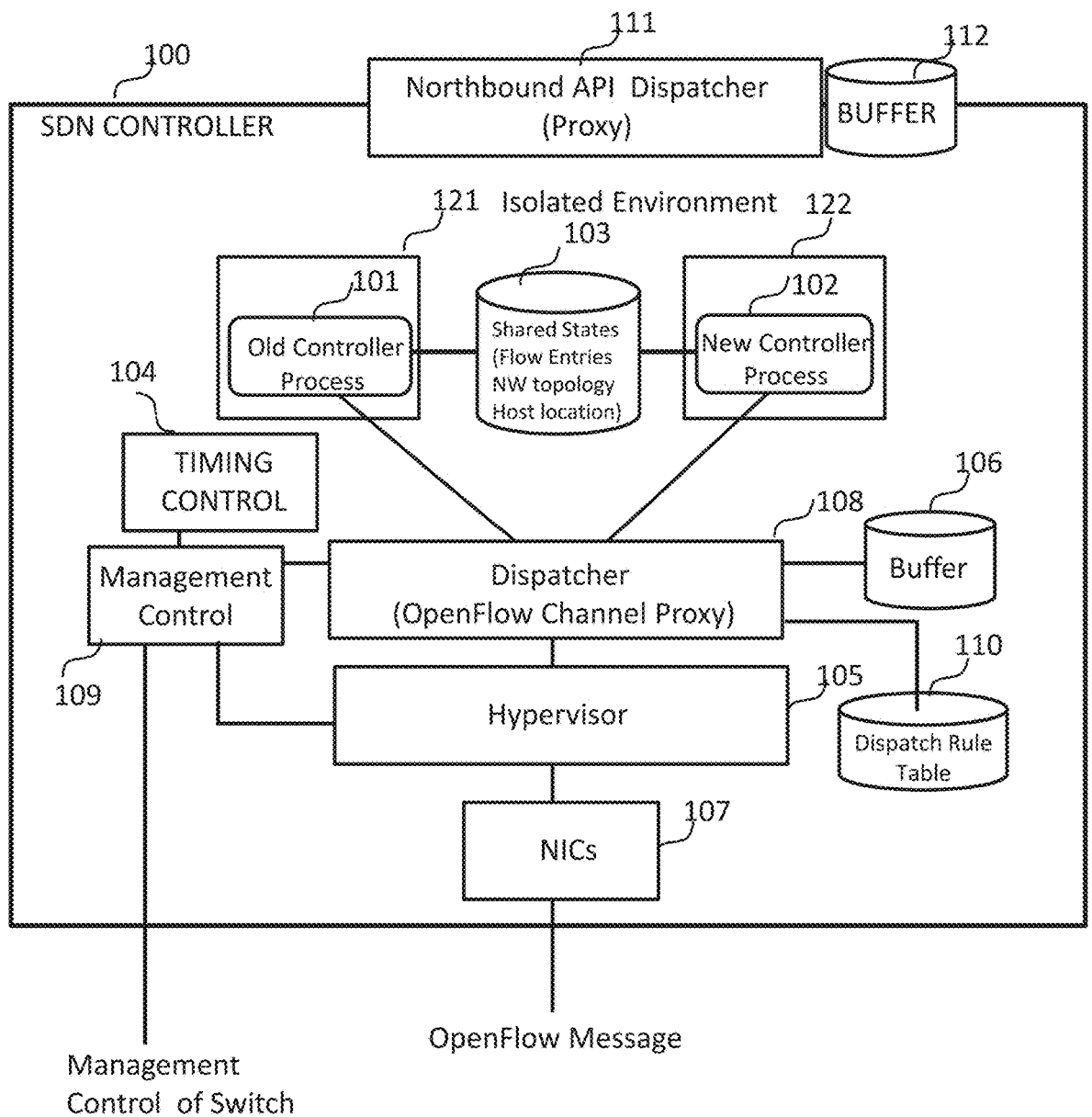
FIG. 11 is a diagram illustrating a controller in a third example embodiment of the present invention.

FIG. 11 illustrates the SDN controller 100 according to a third example embodiment. In FIG. 11, the hypervisor 105 controls and manages an isolated environments 121 and 122 (such as creation of the isolated environments 121 and 122) and manages a controller process (creation and termination of the old controller process 101 and new controller process 102) executed in the isolated environments 121 and 122. The dispatcher 108 is deployed between the hypervisor 105 and isolated environments. In FIG. 11, though not limited thereto, it is assumed that a controller process is allocated, on a per tenant basis. That is, at least one controller process A is allocated to a tenant A, based on contract of the tenant A with a carrier, for example. The dispatcher 108 functions OpenFlow channel proxy that serves as a control proxy to a networking channel control for a tenant.

The dispatcher 108 dispatches an OpenFlow message from a switch belonging to a tenant A network to a controller process allotted to the tenant A, based on a dispatch rule table that defines an association between a tenant network and a target controller process. Features in the SDN controller other than that a controller process is executed in an isolated environment are the same as the SDN controller in the second example embodiment.

Figure 12:
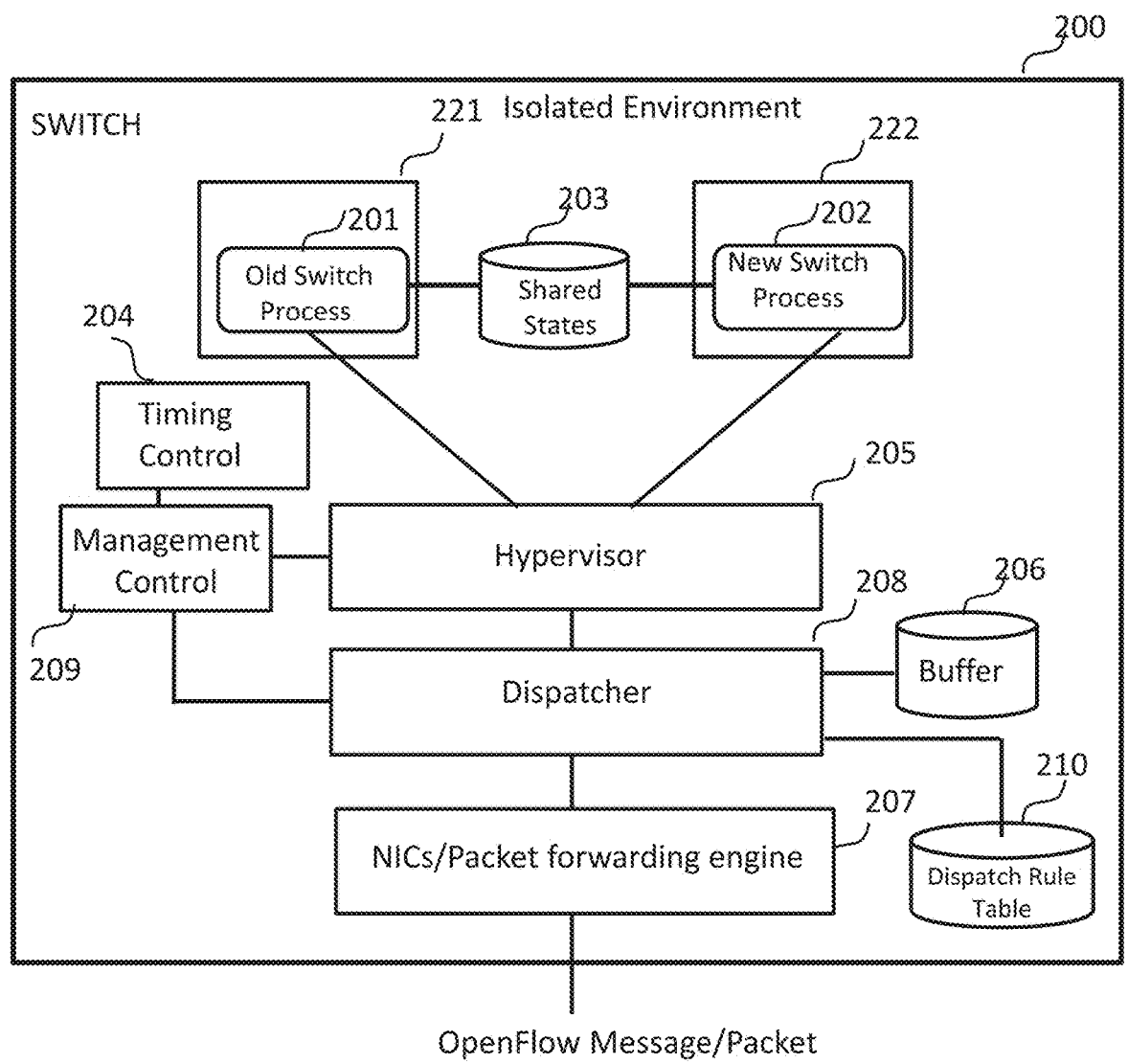
FIG. 12 is a diagram illustrating a configuration of a switch in the third example embodiment of the present invention.

FIG. 12 illustrates the switch in the third example embodiment. The hypervisor 205 may perform control to provide isolated environments 221 and 222 and create/terminate switch processes (old switch process 201 and new switch process 202) executed respectively in the isolated environments 221 and 222. A switch process may be allocated, on a per tenant basis, as shown in FIG. 5. That is, at least one switch process is allocated to a tenant network, such as tenant A, based on contract of the tenant A with a carrier.

The dispatcher 208 dispatches a flow (a packet received from one of NICs 207) via the hypervisor 205 to an associated switch process 201. The dispatcher 208 also dispatches a packet received from a switch process 201 to a corresponding one of the NICs 207 for output of the packet to a network. Features in the switch other than that a switch process is executed in an isolated environment are the same as the switch in the second example embodiment.

Isolation technology is an approach, where a process is executed in an isolated environment. Isolation technology provides a containment environment where a malware can run without affecting an entire system.

Figure 13:
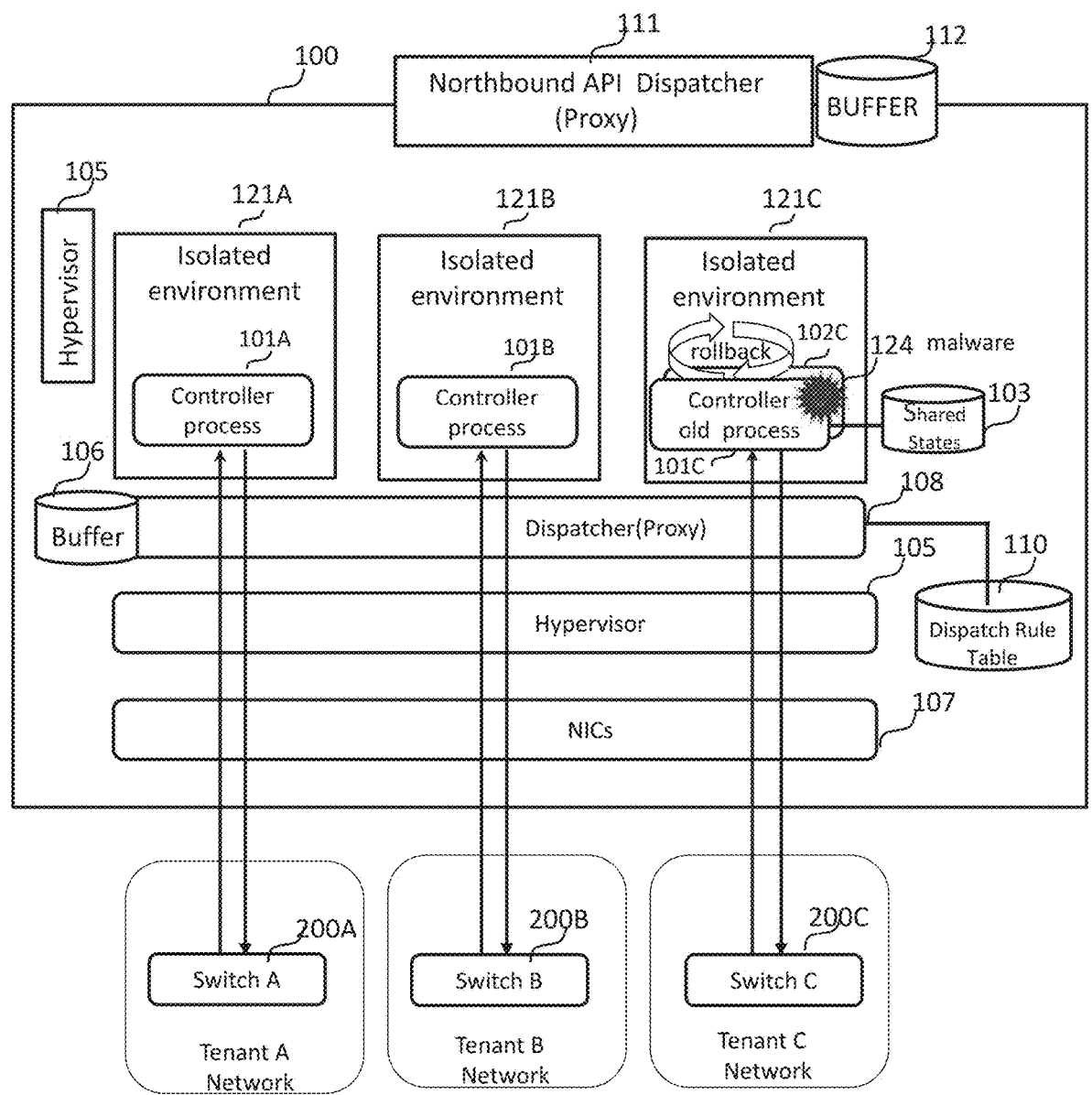
FIG. 13 is a diagram illustrating a tenant based network in the third example embodiment of the present invention.

FIG. 13 illustrates a tenant based network employing the SDN controller as illustrated in FIG. 11. In FIG. 13, it is only for the sake of illustration that there are provided three switch processes 200A-200C. The number of switch processes is not, as a matter of course, limited to three and may be any integer not less than one.

Referring to FIG. 13, it is assumed that a damage done by a malware 124 is contained in an isolated environment 121C, for example. That is, even if a controller process 101C is compromised by a malware 124, the malware 124 is confined to the isolated environment 121C and a tenant C network, it cannot affect other flows or tenant networks A and B. In this case, the controller process 101C is rolled back to a new controller process 102C in accordance with the operation as described in the above embodiment.

The following describes the isolated environment according to the present example embodiment.

In the present example embodiment, the hypervisor 105 provides memory isolation, though not limited thereto. A memory region (isolated area) assigned to the controller process 101A in the isolated environment 121A is isolated from other memory regions (isolated areas) assigned to other controller processes 101B and 101C in other isolated environments 121B and 121C and isolated from a memory region assigned to OS/Hypervisor or device driver (not shown), except a shared region shared by the controller processes and OS.

Figure 14A:
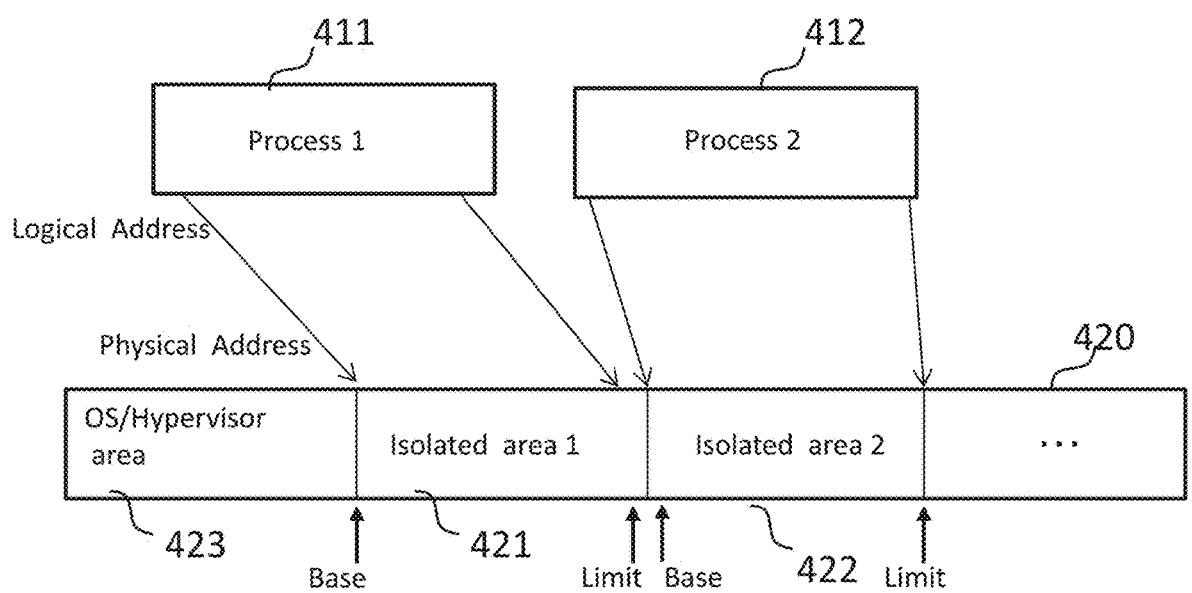
FIG. 14A is a diagram illustrating a memory isolation in the example embodiment of the present invention.

FIG. 14A illustrates an example of a hypervisor or hardware based memory protection. As shown in FIG. 14A, isolated areas 421 and 422 allotted respectively to processes 411, 412 are separate memory regions in a memory 420. An OS/Hypervisor area 423 allotted to OS (Hypervisor) is different from isolated areas 421 and 422 allotted to processes 411 and 412 and hence OS (Hypervisor) is protected from the process 411, 412. Since memory spaces addressed by process 411 and 412 are different, each of the processes 411 and 412 cannot have a memory access to an isolated area of the other process.

Though not limited thereto, a hypervisor or a hardware based MMU (Memory Management Unit) may performs address translation from a logical (virtual) address of each process to a physical address by using a relocation register (not shown) to which a base address of a memory space for the process is set. The base address in the relocation register and the logical address are added to generate the physical address. MMU also checks that the generated physical address is in a range defined by the base address and the limit address of the process. This functions as memory protection mechanism. When MMU detects an occurrence of memory access violation by a fault process, such as, accessing a memory space that the process has no access right, or accessing outside the range defined by the base address and the limit allotted to the process is detected, the fault process may be notified of addressing error by trap, or aborted with notification of addressing error.

Figure 14B:
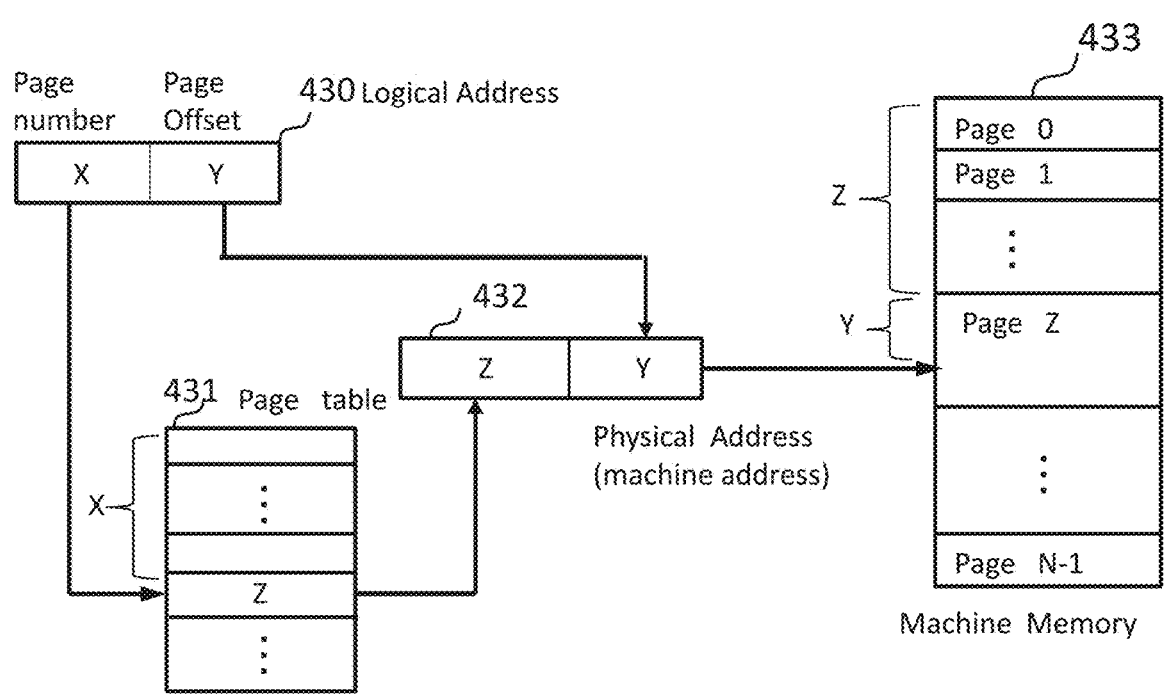
FIG. 14B is a diagram illustrating a paging.

The MMU-based memory protections may be implemented by a page table as illustrated in FIG. 14B. It is noted that MMU is not limited to page based MMU and for example, segment-based memory protection may also be employed. A page is a fixed-length contiguous block (for example, 4 KB (Kilo Bytes)). A logical address (virtual address) 430 issued from a process includes page number field (n-m bits) and an offset field (m bits). In this case, a page size is 2^m, where ^ indicates a power operator, and a memory address space for the process is 2^n. The page number X (upper n-m bits) of the logical address 430 is extracted for supply to a page table 431 as an index (page entry). A value Z (p-bits) stored in the Xth entry of the page table 431 is read out from the page table 431. That is, the page table 431 performs page translation from X to Z. Generally, a bit length p of Z is longer than that of X. Z is combined, as upper bits, with lower m bits Y in the logical address 430 to generate a physical address 432 for supply to a memory (machine memory) 433. In this case, an offset address Y in the Z page in the memory 433 is accessed.

Referring to FIG. 11 to FIG. 13, the hypervisor 105 or 205 may be configured to retain in its own memory region, respective page tables for respective switch processes, thereby preventing any processes from tampering with the page translation. For a shared memory region that is shared by switch processes, and OS/Hypervisor, there may be provided an access controller that controls read/write access from the switch process to the shared region, based on access control information, such that only OS/Hypervisor is allowed to perform write operation to the shared region.

The hypervisor 105 or 205 may include a computer software, firmware or hardware and adapted to control hardware resources. Though not limited thereto, when applied to server virtualization, the hypervisor 105 or 205 may control a virtual machine (VM) including: virtualized hardware resources a guest OS and an application, wherein the virtualized hardware resources include virtualized CPU (Central Processing Unit), a virtualized storage, and a virtualized network, for example.

In the above example embodiments, the arrangement in which a process running on a virtual machine is controlled by a hypervisor are described, but the concept of the example embodiments also may be applied to a process running on a processor without hypervisor or without server-virtualization. In the above example embodiments, the arrangement in which a process on a virtual machine is controlled to be executed in an isolated environment by a hypervisor are described, but the concept of the example embodiments also may be applied to a process running on a processor adapted to be able to provide an isolation environment to the process, such as memory isolation without hypervisor.

In the above example embodiments, examples of application to switch and controller are described, but application of the present invention is, as a matter of course, not limited to OpenFlow network.

Each disclosure of the above-listed Patent Literatures and Non Patent Literatures is incorporated herein by reference. Modification and adjustment of each example embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and the like) are possible within the scope of the claims of the present invention. That is, the present invention naturally includes various variations and modifications that could be made by those skilled in the art according to the overall disclosure including the claims and the technical concept.

What is claimed is:

1. A communication apparatus, comprising:
   a storage unit that stores one or more states shared by a first process and a second process, the storage unit enabling the second process to take over the stored one or more states;
   a buffer; and
   a processor configured to:
   process an event by the first process that is a working process;
   during processing of the event by the first process, create the second process for rolling back the first process;
   during the processing of the event by the first process and based on the second process being created, start buffering all of one or more additional events destined for the first process;
   based on completion of the processing of the event by the first process, switch the working process from the first process to the second process; and
   send all of the buffered one or more additional events to the second process that is the working process.

2. The communication apparatus according to claim 1,
wherein the processor is configured to dispatch a signal received to an associated process, based on a dispatch rule that defines association between a matching condition and a target process to which a received signal corresponding to the matching condition is to be dispatched.

3. The communication apparatus according to claim 2, wherein the processor is configured to:
in the buffering, provide to the buffer, all of one or more packets that are received during when the first process is processing the event and that are to be dispatched to the first process, the one or more packets corresponding to the one or more additional events, the buffer storing the one or more packets provided thereto; and
based on the completion of the processing of the event by the first process, change the first process defined as the target process in the dispatch rule to the second process that is the working process.

4. The communication apparatus according to claim 2, wherein the first and second process are each a switch process that, upon reception of a packet dispatched thereto, matches header field information of the packet with a flow entry of the switch process for handling a flow, and handles the packet based on a matching result,
wherein the flow entry of the switch process includes a match field that is matched with header field information of a received packet; and an action field that prescribes handling of a matching packet.

5. The communication apparatus according to claim 1, wherein the first and second process are each a
a controller process that, upon reception of a message from a switch of a plurality of switches, generates a flow entry for handling a flow to be applied for each of the plurality of switches on a path for the flow, the flow entry including a match field that is matched with header field information of a packet received by the switch, and an action field that prescribes handling of a matching packet by the switch, and sends a generated rule to each of the plurality of switches on the path for the flow.

6. The communication apparatus according to claim 1, wherein the processor is configured to execute the first and second processes in an isolated environment allocated thereto,
the isolated environment arranged for each of the first and second processes being isolated from each of one or more environments arranged for ether one or more other processes.

7. The communication apparatus according to claim 1, wherein the communication apparatus operates as a switch apparatus adapted for a flow-based packet forwarding, wherein the first process and the second process are a first switch process and a second switch process, respectively,
wherein the communication apparatus further comprises:
a network interface adapted to be connected to a network, and
wherein the processor is configured to:
dispatch a packet or message received to an associated switch process, based on a dispatch rule that defines association between a matching condition and a target switch process to which a received packet corresponding to the matching condition is to be dispatched,
after creating the second switch process, and finding that the first switch process is processing the event related to the packet received, start buffering all of one or more additional packets related to the one or more additional events to be dispatched for the first switch process;
based on the completion of the processing of the event by the first switch process, switch the working process from the first switch process to the second switch process; and
send all of the buffered one or more additional packets to the second switch process that is the working process.

8. The communication apparatus according to claim 7, wherein the processor is configured to:
when starting the buffering, provide to the buffer, all of the one or more additional packets related to the one or more additional events, the buffer storing all of the one or more additional packets; and
based on the completion of processing of the event by the first switch process, change the first process defined as the target switch process in the dispatch rule to the second switch process switched from the first switch process.

9. The communication apparatus according to claim 7, wherein the processor is configured to execute
the first and second processes in an isolated environment allocated thereto,
the isolated environment arranged for each of the first and second processes being isolated from each of one or more environments arranged for other one or more processes.

10. The communication apparatus according to claim 1, wherein the communication apparatus operates as a controller apparatus that controls one or more switches, each adapted to perform a flow-based packet forwarding, wherein the first process and the second process are a first controller process and a second controller process, respectively,
wherein the communication apparatus further comprises:
a network interface adapted to be connected to each switch, and
wherein the processor is configured to:
dispatch a packet received to an associated controller process, based on a dispatch rule that defines association between a matching condition and a target controller process to which a received packet corresponding to the matching condition is to be dispatched;
after creating the second controller process, and finding that the first controller process is processing the event related to the packet received, start buffering to all of one or more additional packets related with the one or more additional events to be dispatched for the first controller process;
based on completion of the processing of the event by the first controller process, switch the working process from the first controller process to the second controller process; and
to send all of the buffered one or more additional packets to the second controller process that is the working process.

11. The communication apparatus according to claim 10, wherein the processor is configured to:
when starting the buffering, provide to the buffer, all of the one or more additional packets related with the one or more additional events, the buffer storing all of the one or more additional packets provided thereto, and
based on completion of processing of the event by the first controller process, change the first controller process defined as the target process in the dispatch rule to the second controller process switched from the first controller process.

12. The communication apparatus according to claim 10, wherein the processor is configured to execute the first and second controller processes in an isolated environment allocated thereto, the isolated environment arranged for each of the first and second controller processes being isolated from each of one or more environments arranged for other one or more processes.

13. A communication system comprising:

one or more switches, each composed by the communication apparatus as set forth in claim 1, and adapted to perform a flow-based packet forwarding; and a controller to control the one or more switches, wherein the first process and the second process are a first switch process and a second switch process, respectively, wherein the switch further comprises:

a network interface adapted to be connected to a network; and a second processor configured to:

dispatch a packet or a message received to an associated switch process, based on a dispatch rule that defines association between a matching condition and a target switch process to which a received packet corresponding to the matching condition is to be dispatched, after creating the second switch process, and finding that the first switch process is in process of handling the event related to the packet received, start buffering all of one or more additional packets that are received during when the first switch process is processing the event and are to be dispatched by the dispatcher to the first switch process;

based on completion of the processing of the event by the first switch process, switch the working process from the first switch process to the second switch process; and send all of the buffered one or more additional packets to the second switch process that is the working process.

14. The communication system according to claim 13, wherein the processor is configured to:

when starting the buffering, provide to the buffer, all of the one or more additional packets related to the one or more additional events, the buffer storing all of the one or more additional packets provided thereto, and based on the completion of processing of the event by the first switch process, change the first switch process defined as the target switch process in the dispatch rule to the second switch process switched from the first switch process.

15. The communication system according to claim 13, wherein the controller comprises:

a second storage unit that stores second states shared by a first controller process and a second controller process, the storage unit enabling the second controller process to take over the stored second states;

a second buffer;

a second network interface adapted to be connected to the one or more switches; and a third processor configured to:

process the event by a first controller process that is the working process;

during processing of the event by the first controller process, create a second controller process for rolling back the first controller process;

dispatch the packet received to an associated controller process, based on a dispatch rule that defines association between a matching condition and a target controller process to which a received packet corresponding to the matching condition is to be dispatched;

after creating the second controller process, and finding that the first controller process is processing the event related with the packet received, start buffering all of the one or more additional packets that are received during when the first controller process is processing the event and are to be dispatched to the first controller process;

based on completion of the processing of the event by the first controller process, switch the working process from the first controller process to the second controller process; and send all of the buffered one or more additional packets to the second controller process that is the working process.

16. A computer-implemented rollback method, comprising:

processing an event by a first process that is a working process;

during processing of the event by the first process, creating a second process for rolling back the first process, the first process and the second process sharing states stored in a storage unit, the second process being enabled to take over the one stored states;

during the processing of the event by the first process and based on the second process being created, starting buffering all of one or more additional events and destined for the first process and based on completion of the processing of the event by the first process, switching a working process from the first process to the second process; and sending all of the buffered one or more additional events to the second process that is the working process.

17. The rollback method according to claim 16, further comprising:

dispatching a signal received to an associated process, based on a dispatch rule that defines association between a matching condition and a target process to which a received signal corresponding to the matching condition is to be dispatched.

18. The rollback method according to claim 17, further comprising:

in the buffering, providing to a buffer, all of one or more packets that are received during when the first process is processing the event and that are to be dispatched to the first process, the one or more packets corresponding to the one or more additional events, the buffer storing the one or more packets provided thereto; and based on the completion of the processing of the event by the first process, changing a destination of a specified packet in the dispatch rule to the second process switched from the first process.

19. A non-transitory computer readable medium storing a program causing a computer to execute processing comprising:

processing an event by a first process that is a working process;

during processing of the event by the first process, creating a second process for rolling back the first process, the first process and the second process sharing one or more states stored in a storage, the second process being enable to take over the stored one or more states;

dispatching a packet received to an associated process, based on a dispatch rule that defines association between a matching condition and a target process to which a received packet corresponding to the matching condition is to be dispatched;

during the processing of the event by the first process and based on the second process being created all of one or more events that are to be dispatched for the first process;

based on completion of the processing of the event by the first process, switching a working process from the first process to the second process; and sending all of the buffered one or more events to the second process that is the working process.

20. The non-transitory computer readable medium according to claim 19, wherein processing further comprises:

based on the completion of processing of the event by the first process, changing the first process defined as the target process in the dispatch rule to the second process switched from the first process.

* * * * *